(12) United States Patent
Ishikawa et al.

(10) Patent No.: US 10,940,763 B2
(45) Date of Patent: Mar. 9, 2021

(54) BICYCLE POWER SUPPLY SYSTEM

(71) Applicant: Shimano Inc., Osaka (JP)

(72) Inventors: Yuichiro Ishikawa, Osaka (JP); Tetsuya Kitani, Osaka (JP); Kento Mitsuyasu, Osaka (JP)

(73) Assignee: Shimano Inc., Osaka (JP)

( * ) Notice: Subject to any disclaimer, the term of this patent is extended or adjusted under 35 U.S.C. 154(b) by 277 days.

(21) Appl. No.: 16/004,995

(22) Filed: Jun. 11, 2018

(65) Prior Publication Data
US 2018/0370371 A1 Dec. 27, 2018

(30) Foreign Application Priority Data

Jun. 23, 2017 (JP) .............................. JP2017-123469

(51) Int. Cl.
*B60L 11/18* (2006.01)
*H02J 7/00* (2006.01)
(Continued)

(52) U.S. Cl.
CPC .......... *B60L 11/1814* (2013.01); *B60L 50/20* (2019.02); *B60L 53/14* (2019.02); *B60L 58/13* (2019.02); *B60L 58/21* (2019.02); *B60L 58/22* (2019.02); *B62M 6/45* (2013.01); *B62M 6/55* (2013.01); *B62M 6/90* (2013.01); *H02J 7/0021* (2013.01); *H02J 7/0047* (2013.01); *B60L 2200/12* (2013.01); *B60L 2250/10* (2013.01); *B60L 2250/16* (2013.01); *B60L 2260/26* (2013.01); *H02J 7/0048* (2020.01); *H02J 2007/0067* (2013.01)

(58) Field of Classification Search
CPC ....................................................... H02J 7/00
See application file for complete search history.

(56) References Cited

U.S. PATENT DOCUMENTS 6,483,272 B1 11/2002 Terada et al.
2011/0025124 A1* 2/2011 Brabec .................... B60L 58/12
307/9.1
(Continued)

FOREIGN PATENT DOCUMENTS

CN 203528743 U 4/2014
CN 105848960 A 8/2016
(Continued)

*Primary Examiner* — Robert Grant
(74) *Attorney, Agent, or Firm* — Global IP Counselors, LLP

(57) ABSTRACT

A bicycle power supply system is configured to be connectable to a plurality of battery units and configured to switch each of the plurality of battery units between a first state and a second state. The bicycle power supply system includes a memory device and an electronic controller. The memory device stores order information for switching the plurality of battery units from one of the first state and the second state to the other one of the first state and the second state in a predetermined order. The electronic controller switches the plurality of battery units from one of the first state and the second state to the other one of the first state and the second state in accordance with the order information in a case where the plurality of battery units is connected. The memory device is configured to changeably store the order information.

18 Claims, 9 Drawing Sheets

(51) Int. Cl.
  *B62M 6/45*    (2010.01)
  *B62M 6/90*    (2010.01)
  *B62M 6/55*    (2010.01)
  *B60L 58/21*   (2019.01)
  *B60L 53/14*   (2019.01)
  *B60L 58/13*   (2019.01)
  *B60L 58/22*   (2019.01)
  *B60L 50/20*   (2019.01)

(56) References Cited

U.S. PATENT DOCUMENTS

2016/0141894 A1* 5/2016 Beaston .................. H02J 7/342
                                                          320/103
2016/0250937 A1  9/2016 Hayslett et al.
2017/0137087 A1  5/2017 Watarai

FOREIGN PATENT DOCUMENTS

| | | |
|---|---|---|
| DE | 10 2015 209 029 A1 | 11/2016 |
| EP | 3 037 335 A1 | 6/2016 |
| JP | 3-40526 A | 2/1991 |
| JP | 5-68306 A | 3/1993 |
| JP | 8-168106 A | 6/1996 |
| JP | 9-109982 A | 4/1997 |
| JP | 9-226653 A | 9/1997 |
| JP | 9-226664 A | 9/1997 |
| JP | 2002-321675 A | 11/2002 |
| JP | 2004-359032 A | 12/2004 |
| JP | 3641055 B2 | 1/2005 |
| JP | 2006-136150 A | 5/2006 |
| JP | 4114978 B2 | 4/2008 |
| JP | 4435258 B2 | 3/2010 |
| JP | 2011-235749 A | 11/2011 |
| JP | 2012-100449 A | 5/2012 |
| JP | 2017-88093 A | 5/2017 |
| WO | 00/22714 A1 | 4/2000 |
| WO | 2016/074216 A1 | 5/2016 |

* cited by examiner

BICYCLE POWER SUPPLY SYSTEM

CROSS-REFERENCE TO RELATED APPLICATIONS

This application claims priority to Japanese Patent Application No. 2017-123469, filed on Jun. 23, 2017. The entire disclosure of Japanese Patent Application No. 2017-123469 is hereby incorporated herein by reference.

BACKGROUND

Field of the Invention

The present invention generally relates to a bicycle power supply system.

Background Information

Japanese Laid-Open Patent Publication No. 9-226653 (Patent document 1) discloses a bicycle power supply system to which a single battery unit is connected.

SUMMARY

In a case where the capacity of a battery unit is increased, the battery unit is enlarged and is not easy for the user to handle. This lowers the usability.

One object of the present invention is to provide a bicycle power supply system that contributes to improvement of the usability.

In accordance with a first aspect of the present invention, a bicycle power supply system is configured to be connectable to a plurality of battery units and configured to switch each of the plurality of battery units between a first state and a second state. The bicycle power supply system includes a memory device and an electronic controller. The memory device stores order information for switching the plurality of battery units from one of the first state and the second state to the other one of the first state and the second state in a predetermined order. The electronic controller is configured to switch the plurality of battery units from one of the first state and the second state to the other one of the first state and the second state in accordance with the order information stored in the memory device in a case where the plurality of battery units is connected. The memory device is configured to changeably store the order information. With the bicycle power supply system according to the first aspect, a plurality of battery units is connected to the bicycle power supply system. Thus, enlargement of each battery unit is limited. This contributes to improvement of the usability. Additionally, the predetermined order, which switches the battery units between the first state and the second state, can be changed in accordance with a request of the user. This further contributes to improvement of the usability.

In accordance with a second aspect of the present invention, a bicycle power supply system includes a plurality of battery units a memory device and an electronic controller. The memory device stores order information for switching the plurality of battery units from one of a first state and a second state to the other one of the first state and the second state in a predetermined order. The electronic controller is configured to switches the plurality of battery units from one of the first state and the second state to the other one of the first state and the second state in accordance with the order information stored in the memory device. The memory device is configured to changeably store the order information. With the bicycle power supply system according to the second aspect, a plurality of battery units is connected to the bicycle power supply system. Thus, enlargement of each battery unit is limited. This contributes to improvement of the usability. Additionally, the predetermined order, which switches the battery units between the first state and the second state, can be changed in accordance with a request of the user. This further contributes to improvement of the usability.

In accordance with a third aspect of the present invention, the bicycle power supply system according to the first or second aspect further includes a drive unit including a motor that assists in propulsion of a bicycle. The electronic controller is provided in the drive unit. With the bicycle power supply system according to the third aspect, the electronic controller is provided in the drive unit, which is removed from the bicycle power supply system less frequently. Thus, the order information is appropriately changed.

In accordance with a fourth aspect of the present invention, the bicycle power supply system according to the third aspect is configured so that the memory device is provided in the drive unit. With the bicycle power supply system according to the fourth aspect, the electronic controller is provided in the drive unit, which is removed from the bicycle power supply system less frequently. This reduces the potential for loss of the predetermined order.

In accordance with a fifth aspect of the present invention, the bicycle power supply system according to the second aspect is configured so that the electronic controller is provided in one of the plurality of battery units. With the bicycle power supply system according to the fifth aspect, the battery unit switches between its first state and its second state. Thus, the switching is simplified.

In accordance with a sixth aspect of the present invention, the bicycle power supply system according to the fifth aspect is configured so that the memory device is provided in at least one of the plurality of battery units, and the electronic controller is provided in the at least one of the plurality of battery units in which the memory device is provided. With the bicycle power supply system according to the sixth aspect, the electronic controller and the memory device are provided in the same battery unit. Thus, the control-related configuration is simplified.

In accordance with a seventh aspect of the present invention, the bicycle power supply system according to the first or second aspect further includes a charger configured to charge the plurality of battery units. The electronic controller is provided in the charger. With the bicycle power supply system according to the seventh aspect, the electronic controller is provided in the charger. Thus, the electronic controller can be removed during a non-charging time.

In accordance with an eighth aspect of the present invention, the bicycle power supply system according to the third, fifth, or seventh aspect is configured so that the memory device is provided in at least one of the plurality of battery units. With the bicycle power supply system according to the eighth aspect, the memory device is provided in a battery unit. Thus, for example, in a case where the battery unit is connected to the facility of a public building, the convenience is improved.

In accordance with a ninth aspect of the present invention, the bicycle power supply system according to any one of the first to eighth aspects is configured so that the first state includes a non-charge state in which the battery unit is not charged by an external power supply, the second state includes a charge state in which the battery unit is charged by the external power supply with power from the external power supply, the predetermined order includes a first order switching from the non-charge state to the charge state, and the electronic controller is configured to switch the plurality of battery units one by one from the non-charge state to the charge state in the first order. With the bicycle power supply system according to the ninth aspect, priority is given to charging a battery unit needed to be quickly charged by changing the first order, which switches the battery units between the charge state and the non-charge state.

In accordance with a tenth aspect of the present invention, the bicycle power supply system according to the ninth aspect is configured so that the plurality of battery units includes a first battery unit and a second battery unit. The electronic controller is configured to switch one of the first battery unit and the second battery unit from the first state to the second state. The electronic controller is configured to switch the one of the first battery unit and the second battery unit from the charge state to the non-charge state and switch the other one of the first battery unit and the second battery unit from the non-charge state to the charge state upon determining a battery level of the one of the first battery unit and the second battery unit is greater than or equal to a first value predetermined for the one of the first battery unit and the second battery unit. With the bicycle power supply system according to the tenth aspect, in a case where the battery level of one battery unit is greater than or equal to the first value, another battery unit promptly starts to be charged in accordance with the predetermined order.

In accordance with an eleventh aspect of the present invention, the bicycle power supply system according to any one of the first to ninth aspects is configured so that the first state includes a use-limited state in which use of power of the battery unit is limited, the second state includes a use-permitted state in which use of power of the battery unit is permitted, the predetermined order includes a second order switching from the use-limited state to the use-permitted state, and the electronic controller is configured to switch the plurality of battery units one by one from the use-limited state to the use-permitted state in the second order. With the bicycle power supply system according to the eleventh aspect, the user can give priority to using a desired one of the battery units by changing the second order, which switches the battery units between the use-permitted state and the use-limited state.

In accordance with a twelfth aspect of the present invention, the bicycle power supply system according to the eleventh aspect is configured so that the plurality of battery units includes a first battery unit and a second battery unit, the electronic controller is configured to switch one of the first battery unit and the second battery unit from the use-limited state to the use-permitted state. The electronic controller is configured to switch the one of the first battery unit and the second battery unit from the use-permitted state to the use-limited state and switch the other one of the first battery unit and the second battery unit from the use-limited state to the use-permitted state upon determining a battery level of the one of the first battery unit and the second battery unit is less than or equal to a second value predetermined for the one of the first battery unit and the second battery unit. With the bicycle power supply system according to the twelfth aspect, in a case where the battery level of one battery unit is less than or equal to a second value, switching is promptly performed so that power of another battery unit is used in accordance with the predetermined order.

In accordance with a thirteenth aspect of the present invention, the bicycle power supply system according to the tenth aspect is configured so that the first state includes a use-limited state in which use of power of the battery unit is limited, the second state includes a use-permitted state in which use of power of the battery unit is permitted, the predetermined order includes a second order switching from the use-limited state to the use-permitted state, and the electronic controller is configured to switch the plurality of battery units one by one from the use-limited state to the use-permitted state in the second order. With the bicycle power supply system according to the thirteenth aspect, the user can give priority to using a desired one of the battery units by changing the second order, which switches the battery units between the use-permitted state and the use-limited state.

In accordance with a fourteenth aspect of the present invention, the bicycle power supply system according to the thirteenth aspect is configured so that the electronic controller is configured to switch one of the first battery unit and the second battery unit from the use-limited state to the use-permitted state. The electronic controller is configured to switch the one of the first battery unit and the second battery unit from the use-permitted state to the use-limited state and switch the other one of the first battery unit and the second battery unit from the use-limited state to the use-permitted state upon determining a battery level of the one of the first battery unit and the second battery unit is less than or equal to a second value predetermined for the one of the first battery unit and the second battery unit. With the bicycle power supply system according to the fourteenth aspect, in a case where the battery level of one battery unit is less than or equal to the second value, switching is promptly performed so that power of another battery unit is used in accordance with the predetermined order.

In accordance with a fifteenth aspect of the present invention, the bicycle power supply system according to any one of the first to fourteenth aspects is configured so that the memory device is configured to changeably store the order information in accordance with an operation of an operation device operable by a user. With the bicycle power supply system according to the fifteenth aspect, the predetermined order is easily changed to a predetermined order desired by the user by using the operation device.

In accordance with a sixteenth aspect of the present invention, the bicycle power supply system according to the fifteenth aspect further includes an input portion that receives a signal from the operation device. The order information stored in the memory device is changed in response to upon the input portion receiving a signal for changing the order information. With the bicycle power supply system according to the sixteenth aspect, the memory device appropriately changes the predetermined order to a predetermined order desired by the user via the input portion.

In accordance with a seventeenth aspect of the present invention, the bicycle power supply system according to any one of the first to sixteenth aspects further includes a power communication line electrically connecting the plurality of battery units. With the bicycle power supply system according to the seventeenth aspect, the power communication line appropriately allows for the supply of power and communication in the bicycle power supply system.

In accordance with an eighteenth aspect of the present invention, the bicycle power supply system according to any one of the first to seventeenth aspects further includes an indication device that indicates which one of the first state and the second state the plurality of battery units is in. With the bicycle power supply system according to the eighteenth aspect, the user can acknowledge the states of a plurality of battery units by checking the indication device.

In accordance with a nineteenth aspect of the present invention, the bicycle power supply system according to any one of the first to eighteenth aspects is configured so that each of the plurality of battery units includes an indicator that indicates which one of the first state and the second state the battery unit is in. With the bicycle power supply system according to the nineteenth aspect, the user can acknowledge the state of a battery unit by checking the indicator of the battery unit.

The bicycle power supply system of the present invention contributes to improvement of the usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a first embodiment of a bicycle power supply system 40 will now be described with reference to FIG. 1. The bicycle 10 can be a mountain bike, a road bike, or a city bike. Further, the bicycle 10 can be a tricycle or a cargo bike.

Figure 1:
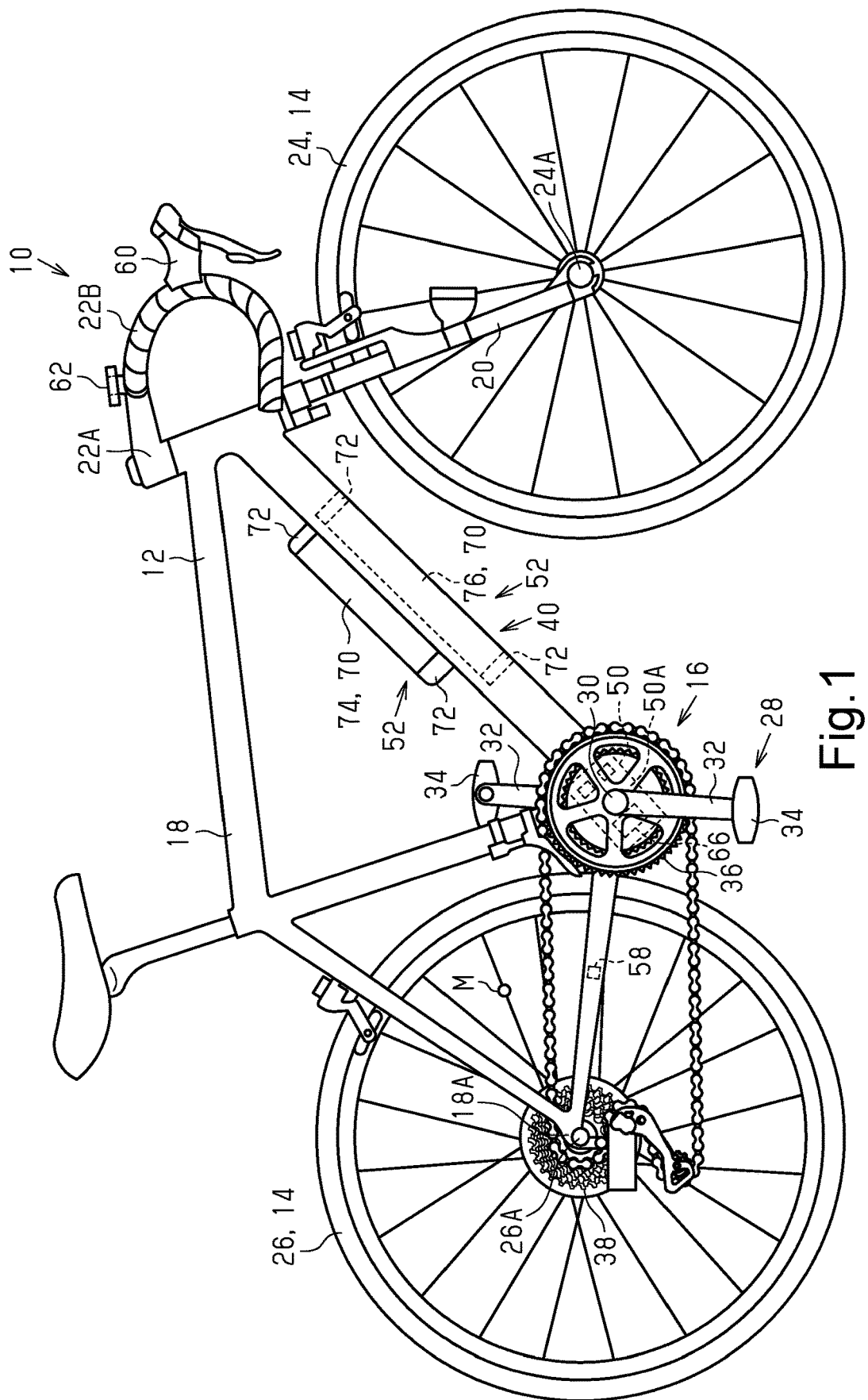
FIG. 1 is a side elevational view of a bicycle including a bicycle power supply system in accordance a first embodiment.

As shown in FIG. 1, the bicycle 10 includes a bicycle body 12, a pair of wheels 14, a drive mechanism 16 and the bicycle power supply system 40. The bicycle body 12 includes a frame 18, a front fork 20, a stem 22A and a handlebar 22B. The front fork 20 is connected to the frame 18. The handlebar 22B is connected to the front fork 20 by the stem 22A so as to be attachable to and removable from the front fork 20. The front fork 20 is supported by the frame 18.

The wheels 14 include a front wheel 24 and a rear wheel 26. The front wheel 24 includes an axle 24A connected to an end of the front fork 20. The rear wheel 26 includes an axle 26A connected to a rear end 18A of the frame 18.

The drive mechanism 16 includes a crank 28 and a pair of pedals 34. The crank 28 includes a crankshaft 30 and a pair of crank arms 32. The drive mechanism 16 transmits human driving force (also called a manual force or a muscular force), which is applied to the pedals 34, to the rear wheel 26. The drive mechanism 16 includes a front rotary body 36 coupled to the crankshaft 30 by a one-way clutch. The one-way clutch is configured to allow forward rotation of the front rotary body 36 in a case where the crank 28 rotates forward and prohibit rearward rotation of the front rotary body 36 in a case where the crank 28 rotates rearward. The front rotary body 36 includes a sprocket, a pulley or a bevel gear. The front rotary body 36 can be coupled to the crankshaft 30 without using a one-way clutch. The drive mechanism 16 is configured to transmit the rotation of the crank 28 to a rear rotary body 38, which is coupled to the rear wheel 26, for example, by a chain, a belt or a shaft. The rear rotary body 38 includes a sprocket, a pulley or a bevel gear. A one-way clutch is provided between the rear rotary body 38 and the rear wheel 26. The one-way clutch is configured to allow forward rotation of the rear wheel 26 in a case where the rear rotary body 38 rotates forward and prohibit rearward rotation of the rear rotary body 38 in a case where the rear wheel 26 rotates rearward. At least one of the one-way clutch coupled to the front rotary body 36 and the one-way clutch coupled to the rear rotary body 38 can be omitted. The front rotary body 36 can include a plurality of front sprockets. The rear rotary body 38 can include a plurality of rear sprockets.

The bicycle power supply system 40 includes a memory device 42 and an electronic controller 44. The bicycle power supply system 40 further includes an input portion 46, a communicator 48, a drive unit 50, a battery 52, a torque sensor 54, a crank rotation sensor 56, a vehicle speed sensor 58, an operation portion 60, an indication device 62, a power communication line 64A, a power supply line 64B and an auxiliary power line 64C. The bicycle power supply system 40 is configured to be connectable to a plurality of battery units 70 and configured to switch each of the plurality of battery units 70 between a first state and a second state.

The drive unit 50 includes a motor 66 and a drive circuit 68. It is preferred that the motor 66 and the drive circuit 68 are provided in the same housing 50A. The drive circuit 68 controls power supplied from the battery 52 to the motor 66. The motor 66 assists in propulsion of the bicycle 10. The motor 66 includes an electric motor. The motor 66 is provided to transmit rotation to a human driving force transmission path, which extends from the pedals 34 to the rear wheel 26, or to the front wheel 24. The motor 66 is provided on the frame 18 of the bicycle 10, the rear wheel 26, or the front wheel 24. In one example, the motor 66 is coupled to a driving force transmission path extending from the crankshaft 30 to the front rotary body 36. It is preferred that a one-way clutch (not shown) is provided in the driving force transmission path between the motor 66 and the crankshaft 30 so that in a case where the crankshaft 30 is rotated in a direction in which the bicycle 10 moves forward, the rotational force of the crank 28 will not rotate the motor 66. Components other than the motor 66 and the drive circuit 68 can be provided in the housing 50A. For example, a reduction unit can be provided to reduce the speed of rotation of the motor 66 and output the rotation.

As shown in FIG. 1, the battery 52 includes the plurality of battery units 70, and a pair of battery holders 72 supporting the battery units 70. The plurality of battery units 70 includes a first battery unit 74 and a second battery unit 76. The plurality of battery units 70 can include three or more battery units 70. In one example, the plurality of battery units 70 includes two to twenty-six battery units 70. At least one of the shapes and the battery capacities of the battery units 70 can differ from each other or can be the same. The battery units 70 can be attached to the exterior of the frame 18 or at least partially accommodated in the frame 18. For example, the first battery unit 74 can be attached to an upper surface of a down tube of the frame 18, and the second battery unit 76 can be accommodated in the down tube of the frame 18. In another example, the first battery unit 74 is attached to the upper surface of the down tube of the frame 18, and the second battery unit 76 is attached to a lower surface of a top tube of the frame 18. The battery 52 is mounted on the bicycle 10 and supplies power to another electric component electrically connected to the battery 52 by a wire, which is, for example, the motor 66. The plurality of battery units 70 can be configured so that at least one of the battery units 70 is provided to be attachable to and removable from the bicycle 10 or so that all of the battery units 70 are provided to be attachable to and removable from the bicycle 10. The plurality of battery units 70 can be provided so as not to attachable to and removable from the bicycle body 12.

Each of the battery units 70 is configured to be switched between the first state and the second state. In a first example, the first state includes a non-charge state in which the battery unit 70 is not charged by an external power supply. The second state includes a charge state in which the battery unit 70 is charged by the external power supply with power from the external power supply. A predetermined order includes a first order switching from the non-charge state to the charge state. In a second example, the first state includes a use-limited state in which use of power of the battery unit 70 is limited. The second state includes a use-permitted state in which use of power of the battery unit 70 is permitted. The predetermined order includes a second order switching from the use-limited state to the use-permitted state.

Figure 2:
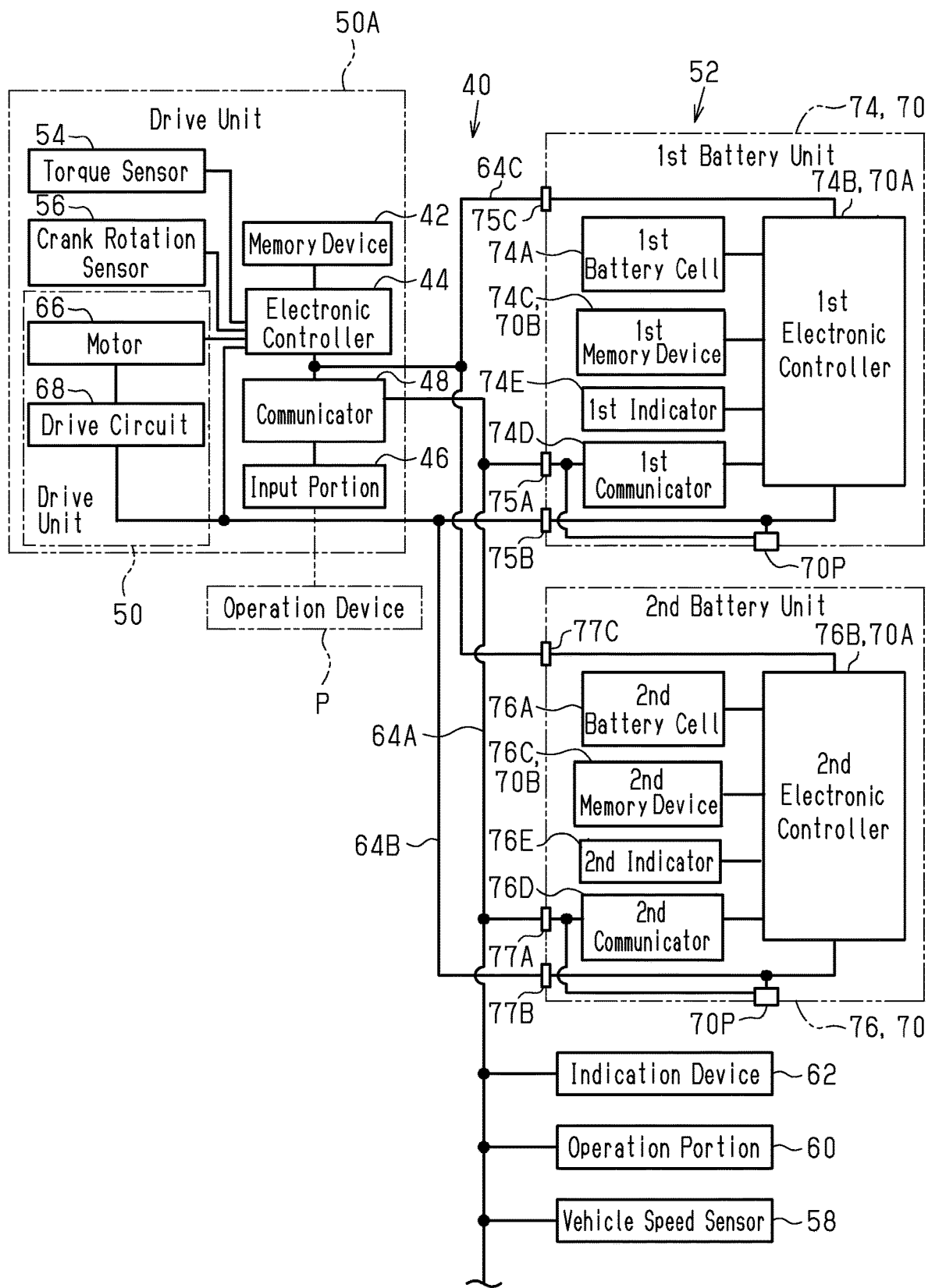
FIG. 2 is a block diagram showing an electrical configuration of the bicycle power supply system shown in FIG. 1.

As shown in FIG. 2, each of the battery units 70 includes at least an electronic controller 70A and a memory device 70B. Each of the electronic controllers 70A includes an arithmetic processing unit executing predetermined control programs. The arithmetic processing unit includes, for example, a central processing unit (CPU) or a micro processing unit (MPU). The electronic controller 70A can include one or more microcomputers. The term "electronic controller" as used herein refers to hardware that executes software programs. The memory device 70B preferably includes a non-volatile memory. The memory device 70B stores various types of control programs and information used for various types of control processing. The memory device 70B includes, for example, a non-volatile memory and a volatile memory, and can includes a ROM (Read Only Memory) device, a RAM (Random Access Memory) device, a hard disk, a flash drive, etc. The memory device 70B is any computer storage device or any computer readable medium with the sole exception of a transitory, propagating signal.

The first battery unit 74 includes one or more first battery cells 74A, a first electronic controller 74B, a first memory device 74C, a first communicator 74D and a first indicator 74E. The first electronic controller 74B is included in the electronic controller 70A. The first memory device 74C is included in the memory device 70B. The first battery cells 74A include a rechargeable battery. It is preferred that the first battery cells 74A include a lithium-ion battery. The first electronic controller 74B changes the state of the first battery unit 74 in accordance with a control signal from the electronic controller 44. The first electronic controller 74B includes an arithmetic processing unit executing predetermined control programs. The arithmetic processing unit includes, for example, a CPU or an MPU. The first electronic controller 74B can include one or more microcomputers. The first electronic controller 74B is operated by power of the first battery cells 74A. The first electronic controller 74B has the first indicator 74E indicate various kinds of information related to the first battery unit 74. The first electronic controller 74B calculates a battery level V of the first battery unit 74 based on at least one of the power usage state and the state of the first battery cells 74A. The first electronic controller 74B stores the calculated information related to the battery level V in the first memory device 74C. The first electronic controller 74B is configured to switch the first battery unit 74 between the first state and the second state. The first memory device 74C stores the battery level V of the first battery unit 74, identification information of the first battery unit 74, and a first value V1 and a second value V2 that are predetermined for the first battery unit 74 related to the battery level V. The first memory device 74C includes a nonvolatile memory device. The first communicator 74D exchanges signals with other components included in the bicycle power supply system 40. The first indicator 74E is configured to indicate which one of the first state and the second state the first battery unit 74 is in. The first communicator 74D includes a communication circuit performing power line communication (PLC). The first communicator 74D can be formed integrally with the first electronic controller 74B.

The first battery unit 74 further includes a first terminal 75A, a second terminal 75B, and a third terminal 75C. The first terminal 75A is connected to the communication circuit of the first communicator 74D. The second terminal 75B is electrically connected to the power supply line 64B. The third terminal 75C is electrically connected to the auxiliary power line 64C. The first to third terminals 75A to 75C can each include a positive terminal and a ground terminal. Alternatively, at least one of the terminals 75A to 75C can share a ground terminal. The second terminal 75B is a terminal for charging and discharging the first battery unit 74. The second terminal 75B can output a first voltage. The first electronic controller 74B includes a switch circuit. The switch circuit is configured to electrically connect the second terminal 75B and the first batter) cells 74A and electrically disconnect the second terminal 75B from the first battery cells 74A. The first electronic controller 74B has the third terminal 75C output a second voltage, which is lower than the first voltage. The first voltage is, for example, 28 to 42 volts. The second voltage is, for example, 5 to 10 volts.

In the use-limited state, power of the first battery unit 74 cannot be output from the second terminal 75B and can be output from the third terminal 75C. In the use-permitted state, power of the first battery unit 74 can be output from at least the second terminal 75B. The use-permitted state can be configured so that power of the first battery unit 74 can be output from the third terminal 75C. In a case where the electronic controller 44 receives an input from any one of the torque sensor 54, the crank rotation sensor 56, the vehicle speed sensor 58, and the operation portion 60 in the use-limited state, the electronic controller 44 can control the first battery unit 74 so that the first battery unit 74 is changed from the use-limited state to the use-permitted state. In a case where the electronic controller 44 does not receive an input from any one of the torque sensor 54, the crank rotation sensor 56, the vehicle speed sensor 58, and the operation portion 60 for a predetermined time, the electronic controller 44 can control the first battery unit 74 so that the first battery unit 74 is changed from the use-permitted state to the use-limited state.

The second battery unit 76 includes one or more second battery cells 76A, a second electronic controller 76B, a second memory device 76C, a second communicator 76D and a second indicator 76E. The second electronic controller 76B is included in the electronic controller 70A. The second memory device 76C is included in the memory device 70B. The second battery cells 76A include a rechargeable battery. It is preferred that the second battery cells 76A include a lithium-ion battery. The second electronic controller 76B changes the state of the second battery unit 76 in accordance with a control signal from the electronic controller 44. The second electronic controller 76B includes an arithmetic processing unit executing predetermined control programs. The arithmetic processing unit includes, for example, a CPU or an MPU. The second electronic controller 76B can include one or more microcomputers. The second electronic controller 76B is operated by power of the second battery unit 76. The second electronic controller 76B has the second indicator 76E indicate various kinds of information related to the second battery unit 76. The second electronic controller 76B calculates the battery level V of the second battery unit 76 based on at least one of the power usage state and the state of the second battery cells 76A. The second electronic controller 76B stores the calculated information related to the battery level V in the second memory device 76C. The second electronic controller 76B is configured to switch the second battery unit 76 between the first state and the second state. The second memory device 76C stores the battery level V of the second battery unit 76, identification information of the second battery unit 76, and a first value V1 and a second value V2 that are predetermined for the second battery unit 76 related to the battery level V. The second memory device 76C includes a nonvolatile memory device. The second communicator 76D exchanges signals with other components included in the bicycle power supply system 40. The second indicator 76E is configured to indicate which one of the first state and the second state the second battery unit 76 is in. The second communicator 76D includes a communication circuit for performing PLC. The second communicator 76D can be formed integrally with the second electronic controller 76B.

The second battery unit 76 further includes a first terminal 77A, a second terminal 77B and a third terminal 77C. The first terminal 77A is connected to the communication circuit of the second communicator 76D. The second terminal 77B is electrically connected to the power supply line 64B. The third terminal 77C is electrically connected to the auxiliary power line 64C. The first to third terminals 77A to 77C each include a positive terminal and a ground terminal. Alternatively, at least one of the terminals 77A to 77C can share a ground terminal. The second terminal 77B is a terminal for charging and discharging the second battery unit 76. The second terminal 77B outputs a first voltage. The second electronic controller 76B includes a switch circuit configured to electrically connect the second terminal 77B and the second battery cells 76A and electrically disconnect the second terminal 77B from the second battery cells 76A. The second electronic controller 76B has the third terminal 77C output a second voltage, which is lower than the first voltage. The first voltage is, for example, 28 to 42 volts. The second voltage is, for example, 5 to 10 volts.

In the use-limited state, power of the second battery unit 76 cannot be output from the second terminal 77B and can be output from the third terminal 77C. In the use-permitted state, power of the second battery unit 76 can be output from at least the second terminal 77B. The use-permitted state can be configured so that power of the second battery unit 76 can be output from the third terminal 77C. In a case where the electronic controller 44 receives an input from any one of the torque sensor 54, the crank rotation sensor 56, the vehicle speed sensor 58, and the operation portion 60 in the use-limited state, the electronic controller 44 can control the second battery unit 76 so that the second battery unit 76 is changed from the use-limited state to the use-permitted state. In a case where the electronic controller 44 does not receive an input from any one of the torque sensor 54, the crank rotation sensor 56, the vehicle speed sensor 58, and the operation portion 60 for a predetermined time, the electronic controller 44 can control the second battery unit 76 so that the second battery unit 76 is changed from the use-permitted state to the use-limited state.

Figure 3:
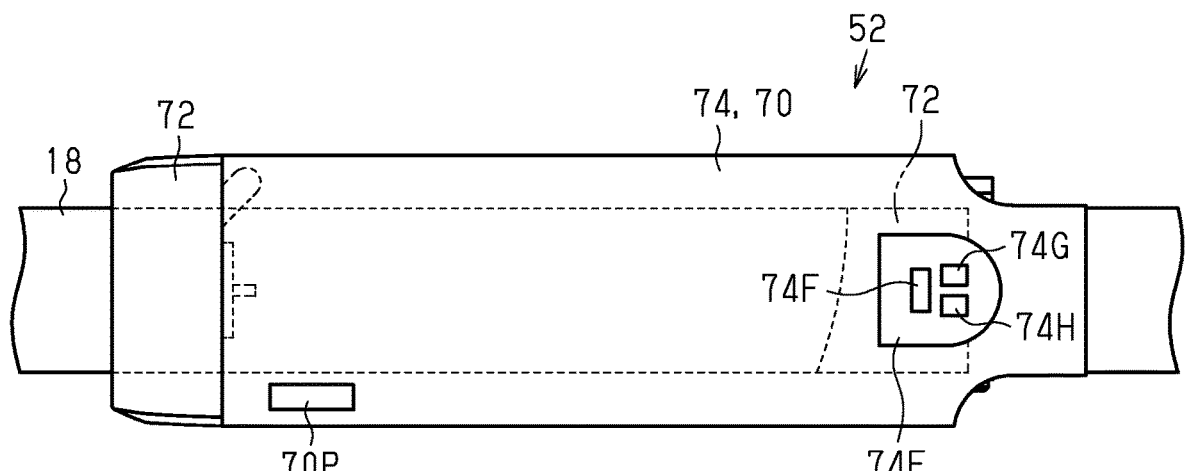
FIG. 3 is a plan view of the first battery unit shown in FIG. 2.

The plurality of battery units 70 respectively includes the indicators 74E, 76E. As shown in FIG. 3, the first indicator 74E includes a charge indicator 74F, a discharge indicator 74G and a charge level indicator 74H. The charge indicator 74F includes, for example, one indication window and a light emitting diode (LED) corresponding to the indication window. The charge indicator 74F is illuminated in a case where the first battery unit 74 is in the charge state and unilluminated in a case where the first battery unit 74 is in the non-charge state. The discharge indicator 74G, which includes, for example, one indication window and a light emitting diode (LED) corresponding to the indication window, is illuminated in a case where the first battery unit 74 is in the use-permitted state and unilluminated in a case where the first battery unit 74 is in the use-limited state. The charge indicator 74F and the discharge indicator 74G can be liquid crystal screens indicating, with letters or images, the one of the charge state, the non-charge state, the use-permitted state, and the use-limited state that the first battery unit 74 is in.

The charge level indicator 74H includes a single indication window 74I and one or more LEDs 74J. The charge level indicator 74H shows information corresponding to the battery level V of the first battery unit 74. Since the charge level indicator 74H shows quantitative information of the battery level V in the single indication window 74I, the charge level indicator 74H can have a decreased area. The charge level indicator 74H is configured to show the information corresponding to the battery level V during the charging of the battery units 70.

Figure 4:
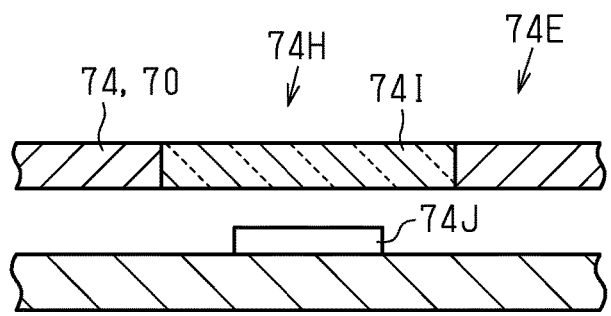
FIG. 4 is a partial cross-sectional view of the first battery unit shown in FIG. 3 showing a first example of the charge level indicator.

FIG. 4 shows a first example of the charge level indicator 74H including the single indication window 74I and a single LED 74J. The first electronic controller 74B controls the illumination state of the LED 74J in accordance with the battery level V of the first battery unit 74 to indicate the battery level V of the first battery unit 74. Table 1 shows the relationship between the battery level V of the first battery unit 74 and the illumination state of the LED 74J. In a case where the battery level V is less than or equal to 100% and greater than 80%, the LED 74J is continuously illuminated. In a case where the battery level V is less than or equal to 80% and greater than 60%, the LED 74J continues to flicker. In a case where the battery level V is less than or equal to 60% and greater than 40%, one cycle of the unilluminated state interrupts after the LED 74J flickers three times. In a case where the battery level V is less than or equal to 40% and greater than 20%, two cycles of the unilluminated state interrupt after the LED 74J flickers twice. In a case where the battery level V is less than or equal to 20% and greater than 0%, three cycles of the unilluminated state interrupt after the LED 74J flickers once. In a case where the battery level V is 0% the LED 74J is continuously unilluminated.

TABLE 1

| Battery Level V | Elapsed Time → | | | | | | | | |
|---|---|---|---|---|---|---|---|---|---|
| 100% | On | On | On | On | On | On | On | On | On |
| 80% | Flicker | Flicker | Flicker | Flicker | Flicker | Flicker | Flicker | Flicker | Flicker |
| 60% | Flicker | Flicker | Flicker | Off | Flicker | Flicker | Flicker | Off | Flicker |
| 40% | Flicker | Flicker | Off | Off | Flicker | Flicker | Off | Off | Flicker |
| 20% | Flicker | Off | Off | Off | Flicker | Off | Off | Off | Flicker |
| 0% | Off | Off | Off | Off | Off | Off | Off | Off | Off |

Figure 5:
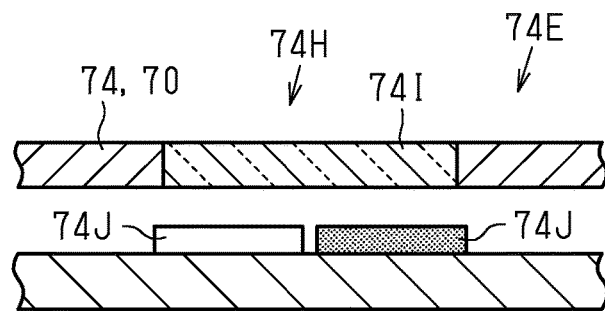
FIG. 5 is a partial cross-sectional view of the first battery unit shown in FIG. 3 showing a second example of the charge level indicator.

The charge level indicator 74H shown in FIG. 5 includes the single indication window 74I and two LEDs 74J. The two LEDs 74J emit lights in different colors. The first electronic controller 74B controls the illumination states of the two LEDs 74J in accordance with the battery level V of the first battery unit 74 to indicate the battery level V of the first battery unit 74. For example, if the two LEDs 74J are a red LED and a green LED, in a case where the battery level V is less than or equal to 100% and greater than 70%, only the green LED 74J is illuminated to show green in the indication window 74I. In a case where the battery level V is less than or equal to 70% and greater than 40%, both of the two LEDs 74J are illuminated to show orange in the indication window 74I. In a case where the battery level V is less than or equal to 40% and greater than 10%, only the red LED 74J is illuminated to show red in the indication window 74I. In a case where the battery level V is less than or equal to 10%, both of the LEDs 74J are unilluminated so that the indication window 74I does not show any of the colors.

The second indicator 76E shown in FIG. 2 has the same structure as the first indicator 74E shown in FIGS. 3 to 5. The second indicator 76E includes a charge level indicator including a single indication window and one or more LEDs. The charge level indicator of the second indicator 76E shows information corresponding to the battery level V of the second battery unit 76. Since the charge level indicator of the second indicator 76E shows quantitative information of the battery level V in the single indication window, the charge level indicator can have a decreased area.

At least one of the first battery unit 74 and the second battery unit 76 includes a charging port 70P, which is shown in FIG. 3. The charging port 70P is configured to be connectable to an external power supply. The charging port 70P is configured to be electrically connectable to the one of the electronic controllers 74B, 76B of the battery units 70 including the charging port 70P. The charging port 70P is configured to be attachable to and removable from a connector of a charger connected to an external power supply. In a case where one of the first battery unit 74 and the second battery unit 76 is accommodated in the frame 18 and the other is provided on the exterior of the frame 18, it is preferred that the charging port 70P is provided in only the one of the first battery unit 74 and the second battery unit 76 that is provided on the exterior of the frame 18. The charging port 70P includes a plurality of terminals. Some of the terminals are electrically connected to the electronic controllers 74B, 76B of the battery units 74, 76. Some of the remaining terminals are electrically connected to the communicators 74D, 76D of the battery units 74, 76.

The torque sensor 54, which is shown in FIG. 2, outputs a signal corresponding to human driving force. The torque sensor 54 detects human driving force input to the drive mechanism 16 via the pedals 34. The torque sensor 54 can be provided in the human driving force transmission path between the crankshaft 30 and the front rotary body 36 or on one of the crankshaft 30, the front rotary body 36, the crank arms 32, and the pedals 34. For example, a strain sensor, an optical sensor, or a pressure sensor may be used to obtain the torque sensor 54. The strain sensor includes a strain gauge, a magnetostriction sensor, and a piezoelectric sensor. Any sensor can be used as the torque sensor 54 as long as the sensor outputs a signal corresponding to human driving force applied to the crank arms 32 or the pedals 34. The torque sensor 54 can be provided in the housing 50A of the drive unit 50 and connected to the electronic controller 44 by a wire different from the power communication line 64A. Alternatively, the torque sensor 54 can be electrically connected to the electronic controller 44 through wireless communication. The torque sensor 54 can be connected to the power communication line 64A to be electrically connected to the electronic controller 44. In this case, the torque sensor 54 includes a communicator configured to perform PLC.

The crank rotation sensor 56 detects a rotational angle of the crank 28. The crank rotation sensor 56 is attached to the frame 18 of the bicycle 10 or the housing 50A of the drive unit 50. The crank rotation sensor 56 is configured to include a magnetic sensor outputting a signal corresponding to magnetic field strength. An annular magnet, the magnetic field strength of which changes in the circumferential direction, is provided on the crankshaft 30 coaxially with the crankshaft 30. The use of a magnetic sensor outputting a signal corresponding to magnetic field strength allows the rotational speed of the crank 28 and the rotational angle of the crank 28 to be detected with a single sensor. This simplifies the structure and the assembly. The crank rotation sensor 56 can detect the rotational speed of the crank 28 in addition to the rotational angle of the crank 28.

Instead of a magnetic sensor, the crank rotation sensor 56 can include an acceleration sensor provided on the crankshaft 30 or the crank arms 32. The output of the acceleration sensor includes an inclination angle of the acceleration sensor. The electronic controller 44 calculates the rotational angle of the crank 28 based on the inclination angle of the acceleration sensor.

The crank rotation sensor 56 can be provided on a member that rotates integrally with the crankshaft 30 in the human driving force transmission path between the crankshaft 30 and the front rotary body 36. For example, in a case where a one-way clutch is not provided between the crankshaft 30 and the front rotary body 36, the crank rotation sensor 56 can be provided on the front rotary body 36. The crank rotation sensor 56 can be provided in the housing 50A of the drive unit 50 and connected to the electronic controller 44 by a wire different from the power communication line 64A. Alternatively, the crank rotation sensor 56 can be electrically connected to the electronic controller 44 through wireless communication. The crank rotation sensor 56 can be connected to the power communication line 64A to be electrically connected to the electronic controller 44. In this case, the crank rotation sensor 56 includes a communicator configured to perform PLC.

The vehicle speed sensor 58, which is shown in FIG. 1, detects the rotational speed of the wheel 14. The vehicle speed sensor 58 is electrically connected to the electronic controller 44 through wired or wireless communication. The vehicle speed sensor 58 is attached to a chainstay of the frame 18. The vehicle speed sensor 58 transmits a signal corresponding to a change in the relative position of a magnet M attached to the rear wheel 26 and the vehicle speed sensor 58 to the electronic controller 44. The electronic controller 44 calculates the vehicle speed of the bicycle 10 based on the rotational speed of the wheel 14. It is preferred that the vehicle speed sensor 58 includes a magnetic reed forming a reed switch or a Hall element. The vehicle speed sensor 58 can be provided on the front fork 20 and configured to detect a magnet attached to the front wheel 24. The vehicle speed sensor 58 can be connected to the power communication line 64A to be electrically connected to the electronic controller 44. In this case, the vehicle speed sensor 58 includes a communicator configured to perform PLC. The vehicle speed sensor 58 can be connected to the electronic controller 44 by a wire different from the power communication line 64A or electrically connected to the electronic controller 44 through wireless communication.

The operation portion 60 is configured to be operable by the user. The operation portion 60 is configured to change the mode of the motor 66 assisting in propulsion of the bicycle 10. The change in the mode of the motor 66 includes at least one of a change between modes corresponding to different assisting forces, which assist in human driving force, and a change between an assist mode and a walk mode. The operation portion 60 is coupled to the handlebar 22B of the bicycle 10. The operation portion 60 is configured to communicate with the electronic controller 44 of the bicycle power supply system 40. The operation portion 60 includes, for example, an operation member, a sensor detecting movement of the operation member, and an electric circuit communicating with the electronic controller 44 in accordance with an output signal of the sensor. The operation portion 60 is connected to the electronic controller 44 so as to perform wired or wireless communication with the electronic controller 44. The operation portion 60 is configured to communicate with the electronic controller 44, for example, through PLC. The operation portion 60 is connected to the power communication line 64A. The operation portion 60 transmits an output signal to the electronic controller 44 in accordance with an operation performed on the operation portion 60 by the user. The operation portion 60 includes one or more operation members for changing the mode of the motor 66. Each operation member includes a push switch, a lever-type switch, or a touchscreen.

The indication device 62 is configured to show information related to the bicycle 10. The indication device 62 shows at least one of the travel condition of the bicycle 10, the surrounding environment, the charge level of the battery 52, the state of a bicycle component, and the content operated by the operation portion 60. The indication device 62 indicates which one of the first state and the second state the plurality of battery units 70 is in. The indication device 62 is coupled to the handlebar 22B, the stem 22A, or the frame 18 of the bicycle 10. The indication device 62 shows information received from at least one of other bicycle components and the drive unit 50. The indication device 62 includes a communicator that outputs signals and receives signals from an external device. The indication device 62 can be integrated with the operation portion 60. The indication device 62 is connected to the power communication line 64A. The indication device 62 can be configured to show the battery levels V of the plurality of battery units 70. The indication device 62 can be configured to show the battery level V of each of the plurality of battery units 70 that is in the use-permitted state. The indication device 62 can be configured to show the battery levels V of the plurality of battery units 70 by switching between the battery levels V. The indication device 62 can be configured to simultaneously show the battery levels V of the plurality of battery units 70. In a case where the indication device 62 simultaneously shows the battery levels V of the plurality of battery units 70, the indication device 62 is configured so that information indicating the battery units 70 that are in the use-permitted state is distinguishable from information indicating the battery units 70 that are in the use-limited state. The indication device 62 can, for example, intermittently show the information indicating the battery units 70 in the use-permitted state or use different colors to show the battery units 70 in the use-permitted state and the battery units 70 in the use-limited state. The indication device 62 can be configured to show the battery level V of each of the plurality of battery units 70 that is in the charge state. In a case where the indication device 62 simultaneously shows the battery levels V of the plurality of battery units 70, the indication device 62 is configured so that information indicating the battery units 70 that are in the charge state is distinguishable from information indicating the battery units 70 that are in the non-charge state. The indication device 62 can, for example, intermittently show the information indicating the battery units 70 in the charge state or use different colors to show the battery units 70 in the charge state and the battery units 70 in the non-charge state.

The power communication line 64A electrically connects the plurality of battery units 70. The power communication line 64A is configured to supply power from the plurality of battery units 70 to the drive unit 50, the vehicle speed sensor 58, the operation portion 60, and the indication device 62. It is preferred that the power communication line 64A includes two wires. One of the two wires includes a ground line. The power communication line 64A transmits electrical signals containing information together with power between the plurality of battery units 70, the drive unit 50, the vehicle speed sensor 58, the operation portion 60, and the indication device 62. The power communication line 64A transmits electrical signals containing information together with power between the plurality of battery units 70, the drive unit 50, the vehicle speed sensor 58, the operation portion 60, and the indication device 62, for example, through PLC. The power communication line 64A is electrically connected to the communicator 48 of the drive unit 50, the first communicator 74D of the first battery unit 74, the second communicator 76D of the second battery unit 76, the vehicle speed sensor 58, the indication device 62, and the operation portion 60. The power communication line 64A can be electrically connected to each of the first terminal 75A and the first terminal 77A by the battery holders 72.

The power supply line 64B electrically connects the plurality of battery units 70. The power supply line 64B is configured to supply power from the battery units 70 to the drive unit 50. The drive unit 50 is configured to supply the power, which is provided via the power supply line 64B, to the indication device 62, the operation portion 60, the torque sensor 54, the crank rotation sensor 56, and the vehicle speed sensor 58. It is preferred that the power supply line 64B includes two wires. One of the two wires includes a ground line. The voltage of the power communication line 64A is set to be lower than the voltage of the power supply line 64B. The power supply line 64B is configured to be electrically connectable to the second terminals 75B, 77B of the battery units 70. The power supply line 64B and the second terminals 75B, 77B of the battery units 70 can be electrically connected to each other by the battery holders 72. The power supply line 64B is electrically connected to the drive circuit 68 and the electronic controller 44. It is preferred that the power supply line 64B is electrically connected to the electronic controller 44 via a voltage conversion circuit and a voltage regulation circuit.

The auxiliary power line 64C is configured to supply power from the battery units 70 to the drive unit 50. The electronic controller 44 is operated by the power supplied from the auxiliary power line 64C. The auxiliary power line 64C and the third terminals 75C, 77C of the battery units 70 can be electrically connected to each other by the battery holders 72. The voltage of the auxiliary power line 64C is set to be lower than the voltage of the power supply line 64B. In a state where power of the battery units 70 is not supplied to the drive unit 50 via the power communication line 64A and the power supply line 64B, power is supplied to the drive unit 50 via the auxiliary power line 64C. Thus, the electronic controller 44 can always communicate with the electronic controllers 74B, 76B of the battery units 70. The power supplied from the auxiliary power line 64C can be provided to the indication device 62, the operation portion 60, and the vehicle speed sensor 58 via the drive unit 50. In such a configuration, the electronic controller 44 can always communicate with the indication device 62, the operation portion 60, and the vehicle speed sensor 58.

The memory device 42 stores information used in various control programs and various control processes. The memory device 42 includes, for example, a nonvolatile memory device and a volatile memory device. The memory device 42 is provided in the drive unit 50. It is preferred that the memory device 42 is accommodated in the housing 50A of the drive unit 50. The memory device 42 stores order information for switching the plurality of battery units 70 from one of the first state and the second state to the other one of the first state and the second state in a predetermined order. The memory device 42 is configured to changeably store the order information. The order information stored in the memory device 42 can be directly changed by the electronic controller 44 or an external device (e.g. a personal computer, a cell phone, or a tablet) without be controlled by the electronic controller 44.

The electronic controller 44 includes an arithmetic processing unit executing predetermined control programs. The arithmetic processing unit includes, for example, a CPU or an MPU. The electronic controller 44 can include one or more microcomputers. The electronic controller 44 further includes a timer. The electronic controller 44 is provided in the drive unit 50. It is preferred that the electronic controller 44 is accommodated in the housing 50A of the drive unit 50. The electronic controller 44 controls the motor 66 in accordance with outputs of the torque sensor 54, the crank rotation sensor 56, the vehicle speed sensor 58, and the operation portion 60. In a case where an electronic device such as a further bicycle component or a charger is connected to the power communication line 64A, and the connected electronic device provides a predetermined signal to the communicator 48 through the power communication line 64A, the electronic controller 44 recognizes the connected electronic device. The electronic controller 44 serves as a master in PLC. The electronic controller of the electronic device connected via the power communication line 64A serves as a slave in PLC.

The communicator 48 is configured to perform PLC with the first communicator 74D and the second communicator 76D. The communicator 48 is further configured to perform PLC with the vehicle speed sensor 58, the operation portion 60, and the indication device 62. The communicator 48 includes a communication circuit for performing PLC. The communicator 48 can be formed integrally with the electronic controller 44.

The input portion 46 is provided in the drive unit 50. The input portion 46 is configured to receive a signal from an operation device P. In a case where the operation device P is, for example, an external computer or a smartphone, the input portion 46 includes a terminal connecting and communicating with the operation device P or a wireless communicator. In a case where the operation device P is connected to the input portion 46 by a wire, the operation device P is electrically connected to the input portion 46 by a wire attachable to and removable from the input portion 46. In a case where the input portion 46 receives a signal for changing the order information, the order information stored in the memory device 42 is changed in response to the input portion 46 receiving a signal for changing the order information. The order information stored in the memory device 42 is changed in accordance with an operation of the operation device P, which is operable by the user. The user changes the order information, for example, by setting a priority rank for the identification number of each battery unit 70 connected to the bicycle power supply system 40 stored in the memory device 42. It is preferred that the memory device 42 stores initial information of the order information in advance. It is preferred that the order information includes information in which the identification numbers of the plurality of battery units 70 are associated with the priority ranks.

In a case where the plurality of battery units 70 is connected, the electronic controller 44 switches the plurality of battery units 70 from one of the first state and the second state to the other one of the first state and the second state in accordance with the order information.

The electronic controller 44 switches the plurality of battery units 70 one by one from the non-charge state to the charge state in the first order. The electronic controller 44 switches one of the first battery unit 74 and the second battery unit 76 from the first state to the second state. Then, in a case where the battery level V of the one of the first battery unit 74 and the second battery unit 76 is greater than or equal to the first value V1 predetermined for the one of the first battery unit 74 and the second battery unit 76, the electronic controller 44 switches the one of the first battery unit 74 and the second battery unit 76 from the charge state to the non-charge state and switches the other one of the first battery unit 74 and the second battery unit 76 from the non-charge state to the charge state.

Figure 6:
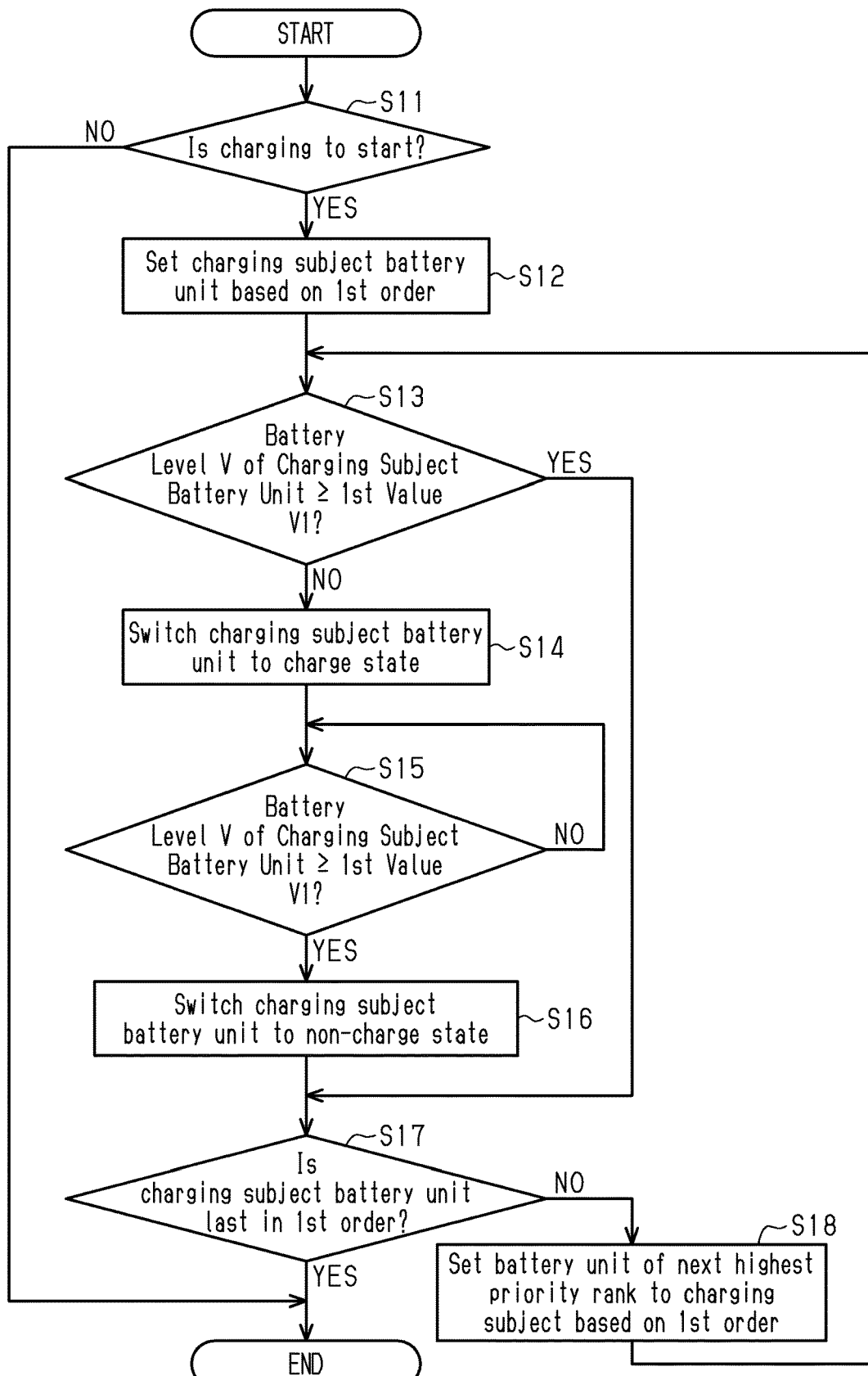
FIG. 6 is a flowchart of control for switching battery units between a charge state and a non-charge state executed by the electronic controller shown in FIG. 2.

The control for switching the plurality of battery units 70 between the charge state and the non-charge state will now be described with reference to FIG. 6. In a case where an external power supply is connected to the bicycle power supply system 40, the electronic controller 44 starts the process and proceeds to step S11 in the flowchart shown in FIG. 6. As long as the external power supply is connected to the bicycle power supply system 40, the electronic controller 44 executes the process from step S11 in predetermined cycles. In a case where the external power supply is not connected to the bicycle power supply system 40, the plurality of battery units 70 is in the non-charge state. Even in a case where both the first battery unit 74 and the second battery unit 76 are in the use-limited state or a case where one of the first battery unit 74 and the second battery unit 76 is in the use-permitted state and the other one is in the use-limited state, power is supplied to the electronic controller 44 from any one of the battery units 74, 76.

In step S11, the electronic controller 44 determines whether or not to start charging. In a case where a charger is connected to one of the charging port 70P of the first battery unit 74 and the charging port 70P of the second battery unit 76 and can output power, the charger transmits a predetermined signal via the power communication line 64A. In a case where the communicator 48 receives the predetermined signal from the charger via the power communication line 64A, the electronic controller 44 determines that the charger can perform charging. In a case where the electronic controller 44 determines that the charger can perform charging, the electronic controller 44 determines that charging is to start. Under a condition in which a predetermined signal is received from the operation portion 60 after the determination that the charger can perform charging, in a case where the operation portion 60 is operated to start charging, the electronic controller 44 can determine that charging is to start. In a case where the electronic controller 44 does not determine that charging is to start, the electronic controller 44 ends the process. In a case where the electronic controller 44 determines that charging is to start, the electronic controller 44 proceeds to step S12.

In step S12, the electronic controller 44 sets one of the battery units 70 to the subject of charging based on the first order. More specifically, the electronic controller 44 sets the battery unit 70 having the highest priority rank in the first order stored in the memory device 42 to the battery unit 70 of the charging subject. In a case where the plurality of battery units 70 includes only the first battery unit 74 and the second battery unit 76 and the first battery unit 74 has a higher priority rank than the second battery unit 76, the electronic controller 44 sets the first battery unit 74 to the battery unit 70 of the charging subject.

The electronic controller 44 proceeds to step S13 and determines whether or not the battery level V of the battery unit 70 of the charging subject is greater than or equal to the first value V1. The electronic controller 44 communicates with the electronic controller 70A of the battery unit 70 of the charging subject to obtain information related to the battery level V stored in the memory device 70B. For example, a value between 80% and 100% of the fully charged state of the battery level V is selected as the first value V1. In a case where the electronic controller 44 determines that the battery level V of the battery unit 70 of the charging subject is greater than or equal to the first value V1, the electronic controller 44 proceeds to step S17 and determines whether or not the battery unit 70 of the charging subject is the last in the first order. In a case where the electronic controller 44 does not determine that the battery unit 70 of the charging subject is the last in the first order, the electronic controller 44 proceeds to step S18. In step S18, the electronic controller 44 sets the battery unit 70, the priority rank of which is the next highest to the battery unit 70 of the present charging subject based on the first order, to the charging subject. For example, in a case where the plurality of battery units 70 includes only the first battery unit 74 and the second battery unit 76, the first battery unit 74 has a higher priority rank than the second battery unit 76, and the first battery unit 74 is the present charging subject, the electronic controller 44 changes the second battery unit 76 to the battery unit 70 of the charging subject. In a case where the electronic controller 44 determines in step S17 that the battery unit 70 of the present charging subject is the last in the first order, the battery levels V of all of the battery units 70 are greater than or equal to the first value V1. Thus, the electronic controller 44 ends the process.

In a case where the electronic controller 44 determines in step S13 that the battery level V of the battery unit 70 of the charging subject is less than the first value V1, the electronic controller 44 proceeds to step S14 to switch the battery unit 70 of the charging subject to the charge state and then proceeds to step S15. The electronic controller 44 communicates with the electronic controller 70A of the battery unit 70 of the charging subject to provide the electronic controller 70A of the battery unit 70 with an instruction that switches the battery unit 70 from the non-charge state to the charge state. In a case where the electronic controller 70A of the battery unit 70 receives the instruction switching the battery unit 70 of the charging subject from the non-charge state to the charge state, the electronic controller 70A of the battery unit 70 switches the battery unit 70 from the non-charge state to the charge state. In the non-charge state, the switch circuit of the electronic controller 70A disconnects the terminal of the charging port 70P from the battery cells. In the charge state, the switch circuit of the electronic controller 70A electrically connects the terminal of the charging port 70P to the battery cells. In step S15, the electronic controller 44 determines whether or not the battery level V of the battery unit 70 of the charging subject is greater than or equal to the first value V1. The electronic controller 44 cyclically communicates with the electronic controller 70A of the battery unit 70 of the charging subject to obtain information related to the battery level V stored in the memory device 70B. In a case where the battery level V of the battery unit 70 of the charging subject is less than the first value V1, the electronic controller 44 again proceeds to step S15 to repeat the determination process of step S15 until the battery level V of the battery unit 70 of the charging subject becomes greater than or equal to the first value V1. In a case where the battery level V of the battery unit 70 of the charging subject is greater than or equal to the first value V1 in step S15, the electronic controller 44 proceeds to step S16.

The electronic controller 44 switches the battery unit 70 of the charging subject to the non-charge state in step S16 and then proceeds to step S17. The electronic controller 44 communicates with the electronic controller 70A of the battery unit 70 of the charging subject to provide the electronic controller 70A of the battery unit 70 with an instruction that switches the battery unit 70 from the charge state to the non-charge state. In a case where the electronic controller 70A of the battery unit 70 receives the instruction switching the battery unit 70 from the charge state to the non-charge state, the electronic controller 70A of the battery unit 70 switches the battery unit 70 from the charge state to the non-charge state. The electronic controller 44 determines in step S17 whether or not the battery unit 70 of the charging subject is the last in the first order. In a case where the electronic controller 44 does not determine that the battery unit 70 of the charging subject is the last in the first order, the electronic controller 44 proceeds to step S18. In step S18, the electronic controller 44 sets the battery unit 70, the priority rank of which is the next highest to the battery unit 70 of the present charging subject based on the first order, to the charging subject.

In a case where the electronic controller 44 determines in step S17 that the battery unit 70 of the present charging subject is the last in the first order, the electronic controller 44 ends the process. In a case where the plurality of battery units 70 includes only the first battery unit 74 and the second battery unit 76 and the first battery unit 74 has a higher priority rank than the second battery unit 76, the electronic controller 44 makes the affirmative determination in step S17 in a case where the battery level V of the second battery unit 76 is greater than or equal to the first value V1 and ends the process.

The electronic controller 44 switches the plurality of battery units 70 one by one from the use-limited state to the use-permitted state in the second order. The electronic controller 44 switches one of the first battery unit 74 and the second battery unit 76 from the use-limited state to the use-permitted state. Then, in a case where the battery level V of the one of the first battery unit 74 and the second battery unit 76 is less than or equal to the second value V2 predetermined for the one of the first battery unit 74 and the second battery unit 76, the electronic controller 44 switches the one of the first battery unit 74 and the second battery unit 76 from the use-permitted state to the use-limited state and switches the other one of the first battery unit 74 and the second battery unit 76 from the use-limited state to the use-permitted state. The electronic controller 44 selects the battery unit 70 that serves as the source of power supplied to the drive unit 50 by switching at least one of the plurality of battery units 70 to the use-permitted state. In the use-limited state, the supply of power via the power supply line 64B is stopped.

Figure 7:
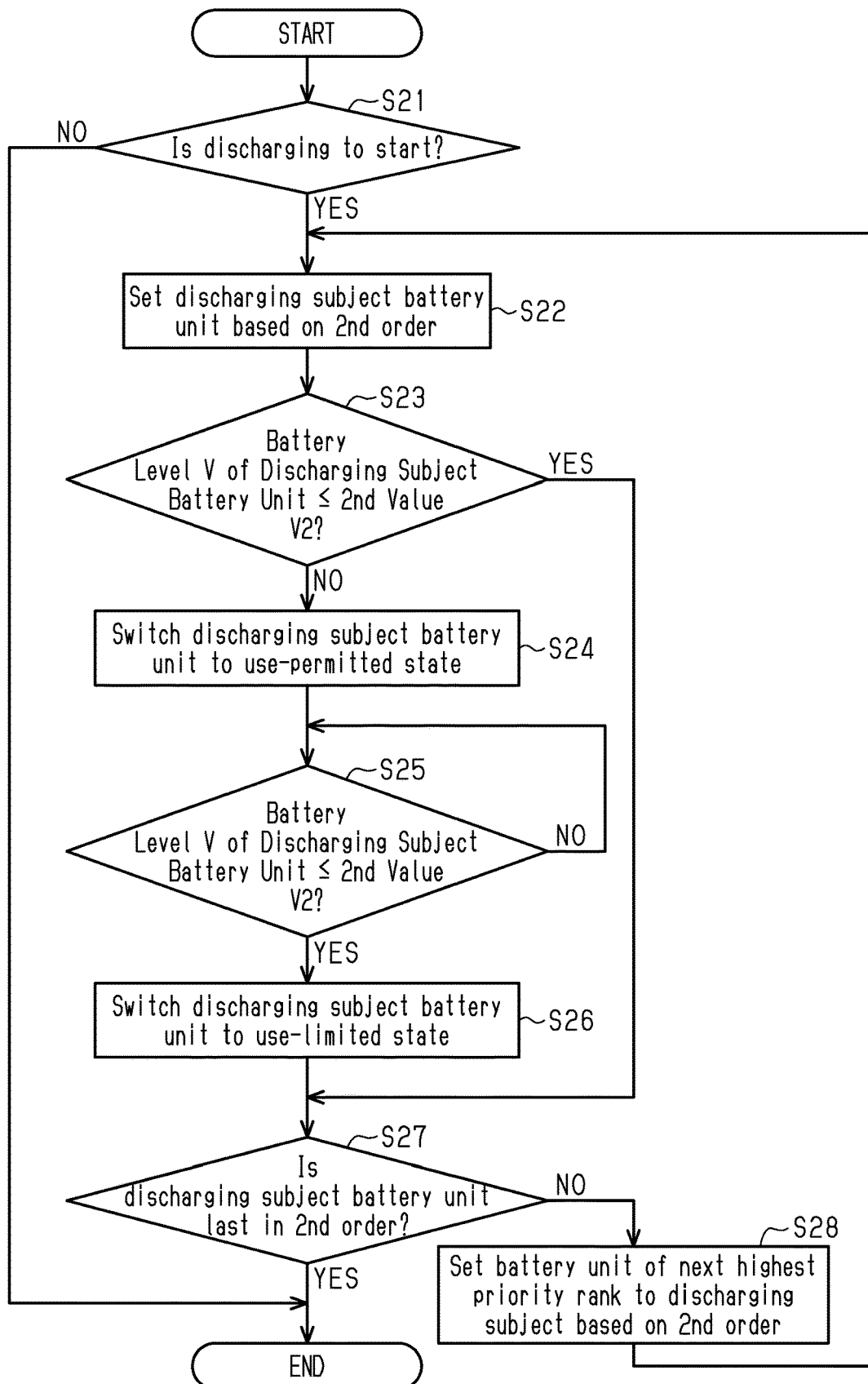
FIG. 7 is a flowchart of control for switching the battery units between a use-permitted state and a use-limited state executed by the electronic controller shown in FIG. 2.

The control for switching the plurality of battery units 70 between the use-permitted state and the use-limited state will now be described with reference to FIG. 7. In a case where power is supplied to the electronic controller 44, the electronic controller 44 starts the process and proceeds to step S21 of the flowchart shown in FIG. 7. As long as the power is supplied to the electronic controller 44 in a state where the battery units 70 are not charged, the electronic controller 44 executes the process from step S21 in predetermined cycles.

In a case where the power is supplied with each of the battery units 70 in the non-charge state, in step S22, the electronic controller 44 sets one of the battery units 70 to the subject of discharging based on the second order. More specifically, the electronic controller 44 sets the battery unit 70 having the highest priority rank in the second order stored in the memory device 42 to the battery unit 70 of the discharging subject. In a case where the plurality of battery units 70 includes only the first battery unit 74 and the second battery unit 76 and the first battery unit 74 has a higher priority rank than the second battery unit 76, the electronic controller 44 sets the first battery unit 74 to the battery unit 70 of the discharging subject.

The electronic controller 44 proceeds to step S23 and determines whether or not the battery level V of the battery unit 70 of the discharging subject is less than or equal to the second value V2. The electronic controller 44 communicates with the electronic controller 70A of the battery unit 70 of the discharging subject to obtain information related to the battery level V stored in the memory device 70B. For example, a value between 1% and 10% of the fully charged state of the battery level V is selected as the second value V2. In a case where the electronic controller 44 determines that the battery level V of the battery unit 70 of the discharging subject is less than or equal to the second value V2, the electronic controller 44 proceeds to step S27 and determines whether or not the battery unit 70 of the discharging subject is the last in the second order. In a case where the electronic controller 44 does not determine that the battery unit 70 of the discharging subject is the last in the second order, the electronic controller 44 proceeds to step S28. In step S28, the electronic controller 44 sets the battery unit 70, the priority rank of which is the next highest to the battery unit 70 of the present discharging subject based on the second order, to the discharging subject. For example, in a case where the plurality of battery units 70 includes only the first battery unit 74 and the second battery unit 76, the first battery unit 74 has a higher priority rank than the second battery unit 76, and the first battery unit 74 is the present discharging subject, the electronic controller 44 changes the battery unit 70 of the discharging subject to the second battery unit 76. In a case where the electronic controller 44 determines in step S27 that the battery unit 70 of the present discharging subject is the last in the second order, the battery levels V of all of the battery units 70 are less than or equal to the second value V2. Thus, the electronic controller 44 ends the process.

In a case where the electronic controller 44 determines in step S23 that the battery level V of the battery unit 70 of the discharging subject is greater than the second value V2, the electronic controller 44 proceeds to step S24 to switch the battery unit 70 of the discharging subject to the use-permitted state and then proceeds to step S25. The electronic controller 44 communicates with the electronic controller 70A of the battery unit 70 of the discharging subject to provide the electronic controller 70A of the battery unit 70 with an instruction that switches the battery unit 70 from the use-limited state to the use-permitted state. In a case where the electronic controller 70A of the battery unit 70 receives the instruction switching the battery unit 70 from the use-limited state to the use-permitted state, the electronic controller 70A of the battery unit 70 switches the battery unit 70 from the use-limited state to the use-permitted state. The electronic controller 70A of the battery unit 70 can be configured to allow power to be output to the power supply line 64B immediately after the battery unit 70 is switched from the use-limited state to the use-permitted state. Alternatively, the electronic controller 70A of the battery unit 70 can be configured to allow power to be output to the power supply line 64B in a case where the communicator receives a predetermined signal after that the battery unit 70 is switched from the use-limited state to the use-permitted state. The predetermined signal includes, for example, a signal provided to the electronic controller 44 in a case where the operation portion 60 is operated. In step S25, the electronic controller 44 determines whether or not the battery level V of the battery unit 70 of the discharging subject is greater than the second value V2. The electronic controller 44 cyclically communicates with the electronic controller 70A of the battery unit 70 of the discharging subject to obtain information related to the battery level V stored in the memory device 70B. In a case where the battery level V of the battery unit 70 of the discharging subject is greater than the second value V2, the electronic controller 44 again proceeds to step S25 and repeats the determination process of step S25 until the battery level V of the battery unit 70 of the discharging subject becomes less than or equal to the second value V2. In a case where the battery level V of the battery unit 70 of the discharging subject is less than or equal to the second value V2 in step S25, the electronic controller 44 proceeds to step S26.

The electronic controller 44 switches the battery unit 70 of the discharging subject to the use-limited state in step S26 and then proceeds to step S27. The electronic controller 44 communicates with the electronic controller 70A of the battery unit 70 of the discharging subject to provide the electronic controller 70A of the battery unit 70 with an instruction that switches the battery unit 70 from the use-permitted state to the use-limited state. In a case where the electronic controller 70A of the battery unit 70 receives the instruction switching the battery unit 70 from the use-permitted state to the use-limited state, the electronic controller 70A of the battery unit 70 switches the battery unit 70 from the use-permitted state to the use-limited state. In a case where the battery unit 70 is switched from the use-permitted state to the use-limited state, the electronic controller 70A of the battery unit 70 prohibits the output of power to the power supply line 64B. In a case where the plurality of battery units 70 supplies power to the power communication line 64A, the electronic controller 44 can be configured to prohibit the output of power to the power supply line 64B and also prohibit output of power to the power communication line 64A of the battery unit 70 of the discharging subject in a case where the electronic controller 70A of the battery unit 70 switches the battery unit 70 from the use-permitted state to the use-limited state. In step S27, the electronic controller 44 determines whether or not the battery unit 70 of the discharging subject is the last in the second order. In a case where the electronic controller 44 does not determine that the battery unit 70 of the discharging subject is the last in the second order, the electronic controller 44 proceeds to step S28. In step S28, the electronic controller 44 sets the battery unit 70, the priority rank of which is the next highest to the battery unit 70 of the present discharging subject, to the discharging subject.

In a case where the electronic controller 44 determines in step S28 that the battery unit 70 of the discharging subject is the last in the second order, the electronic controller 44 ends the process. In a case where the plurality of battery units 70 includes only the first battery unit 74 and the second battery unit 76 and the first battery unit 74 has a higher priority rank than the second battery unit 76, the electronic controller 44 makes the affirmative determination in step S27 in a case where the battery level V of the second battery unit 76 is less than or equal to the second value V2 and ends the process.

In a state where the plurality of battery units 70 is connected, the bicycle power supply system 40 is configured so that the plurality of battery units 70 is chargeable from an external power supply. Thus, the user does not need to remove the battery units 70 from the bicycle power supply system 40 for charging. For example, the plurality of battery units 70 that are installed on the bicycle 10 can be charged. Since the plurality of battery units 70 is sequentially charged in the first order, the battery units 70 can be charged in a way suitable for the user using the battery units 70. For example, the battery unit 70 accommodated in the frame 18 is charged first, or the battery unit 70 unremovable from the frame 18 is charged first.

In a state where the plurality of battery units 70 is connected, the bicycle power supply system 40 sequentially discharges the plurality of battery units 70 in the second order. Thus, the battery units 70 can be discharged in a way suitable for the user using the battery units 70. For example, the battery unit 70 having a larger battery capacity is discharged first. In a case where the battery units 70 are removed and charged after the bicycle 10 travels, for example, only the battery units 70 that have been used can be removed and charged.

Second Embodiment

Figure 8:
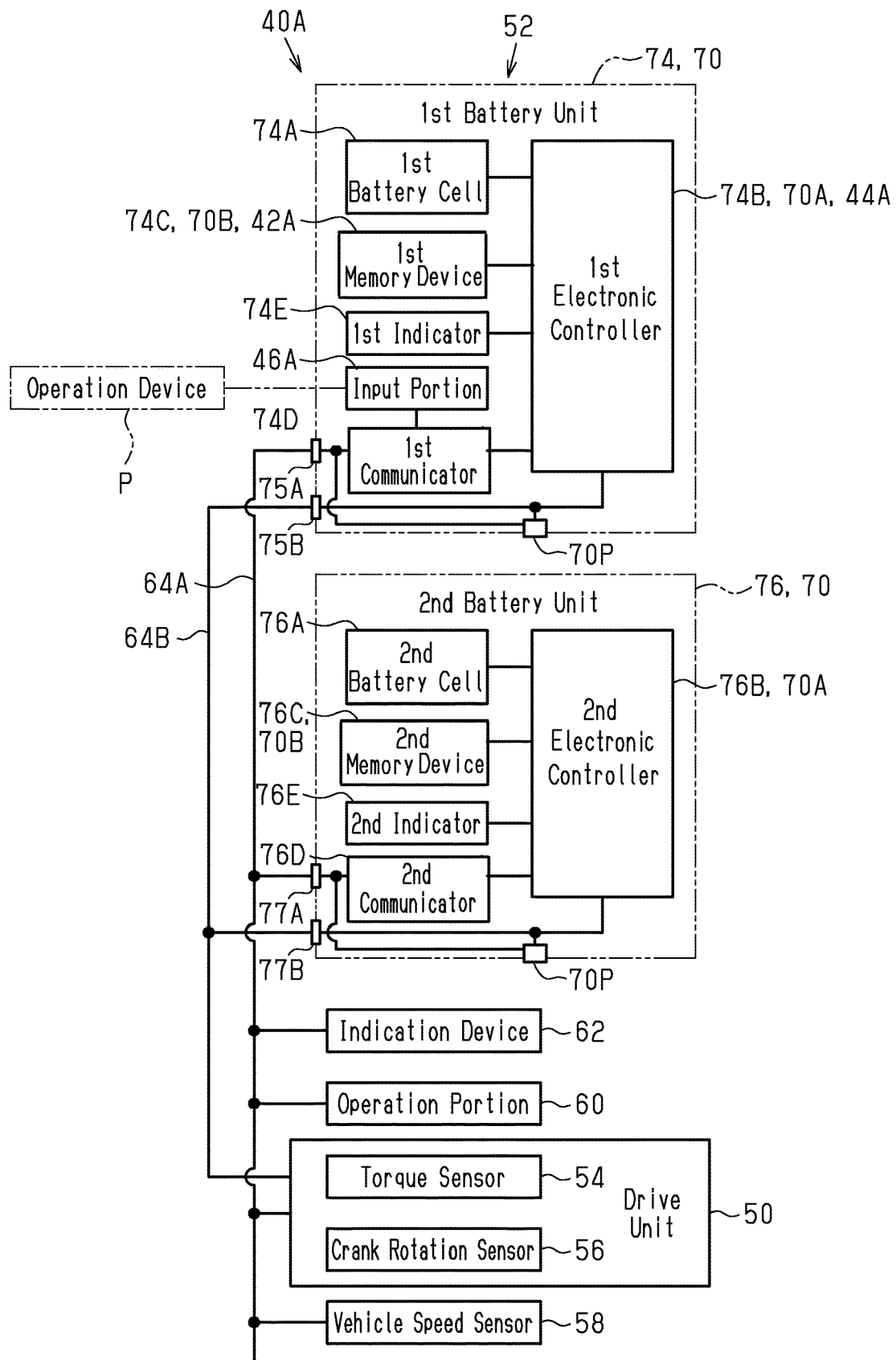
FIG. 8 is a block diagram showing an electrical configuration of a second embodiment of a bicycle power supply system.

A second embodiment of a bicycle power supply system 40A will now be described with reference to FIG. 8. The bicycle power supply system 40A of the second embodiment has the same configuration as the bicycle power supply system 40 of the first embodiment except that the first order is stored in at least one of the memory devices 70B of a battery units 70 instead of the memory device 42 of the drive unit 50 and the process for switching the battery units 70 between the first state and the second state is executed by the electronic controller 70A of the battery unit 70 instead of the electronic controller 44 of the drive unit 50. The same reference characters are given to those components that are the same as the corresponding components of the first embodiment. Such components will not be described in detail. FIG. 8 does not show the auxiliary power line 64C and the third terminals 75C, 77C.

The bicycle power supply system 40A includes a memory device 42A and an electronic controller 44A. The bicycle power supply system 40A further includes an input portion 46A, the drive unit 50, the battery 52, the torque sensor 54, the crank rotation sensor 56, the vehicle speed sensor 58, the operation portion 60, the indication device 62, and the power communication line 64A. The bicycle power supply system 40A is configured to be connectable to the plurality of battery units 70 and configured to switch each of the plurality of battery units 70 between the first state and the second state.

Each of the battery units 70 is switched between the first state and the second state. In the present embodiment, the first state includes the non-charge state, in which the battery unit 70 is not charged by an external power supply. The second state includes the charge state, in which the battery unit 70 is charged by the external power supply with power from the external power supply. The predetermined order includes the first order switching from the non-charge state to the charge state.

The memory device 42A stores information used in various control programs and various control processes. The memory device 42A includes, for example, a nonvolatile memory device and a volatile memory device. The memory device 42A is provided in one of the plurality of battery units 70. The memory device 42A is provided, for example, in the first battery unit 74. The memory device 42A is included in the first memory device 74C. The memory device 42A stores order information for switching the plurality of battery units 70 from one of the first state and the second state to the other one of the first state and the second state in a predetermined order. The memory device 42A is configured to changeably store the order information. The order information stored in the memory device 42A can be directly changed by the electronic controller 44A or an external device (e.g. a personal computer, a cell phone, or a tablet) without be controlled by the electronic controller 44A.

The electronic controller 44A includes an arithmetic processing unit executing predetermined control programs. The arithmetic processing unit includes, for example, a CPU or an MPU. The electronic controller 44A can include one or more microcomputers. The electronic controller 44A further includes a timer. The electronic controller 44A is provided in one of the plurality of battery units 70. The electronic controller 44A is provided in one of the plurality of battery units 70 in which the memory device 42A is provided. The electronic controller 44A is provided, for example, in the first battery unit 74. The electronic controller 44A is included in the first electronic controller 74B. In the present embodiment, the electronic controller 44A serves as a master in PLC. The electronic controller of the electronic device connected to the power communication line 64A serves as a slave in PLC.

In a case where the plurality of battery units 70 is connected, the electronic controller 44A switches the plurality of battery units 70 from one of the first state and the second state to the other one of the first state and the second state in accordance with the order information. The first electronic controller 74B of the first battery unit 74 switches the state of the first battery unit 74. The second electronic controller 76B of the second battery unit 76 switches the state of the second battery unit 76 in accordance with a control signal from the electronic controller 44A.

The electronic controller 44A switches the plurality of battery units 70 one by one from the non-charge state to the charge state in the first order. The electronic controller 44A switches one of the first battery unit 74 and the second battery unit 76 from the first state to the second state. Then, in a case where the battery level V of the one of the first battery unit 74 and the second battery unit 76 is greater than or equal to the first value V1 predetermined for the one of the first battery unit 74 and the second battery unit 76, the electronic controller 44A switches the one of the first battery unit 74 and the second battery unit 76 from the charge state to the non-charge state and switches the other one of the first battery unit 74 and the second battery unit 76 from the non-charge state to the charge state. The electronic controller 44A switches the plurality of battery units 70 between the charge state and the non-charge state through the same control as in the first embodiment of the process shown in FIG. 6.

The input portion 46A is provided in one of the plurality of battery units 70. The input portion 46A is provided, for example, in the first battery unit 74. The input portion 46A receives a signal from the operation device P. In a case where the operation device P is an external computer or a smartphone, the input portion 46A includes a terminal connecting and communicating with the operation device P or a wireless communicator (e.g., a wireless transmitter). In a case where the input portion 46A receives a signal for changing the order information, the order information stored in the memory device 42A is changed in response to the input portion 46 receiving a signal for changing the order information. The order information stored in the memory device 42A is changed in accordance with an operation of the operation device P, which is operable by the user.

Third Embodiment

Figure 9:
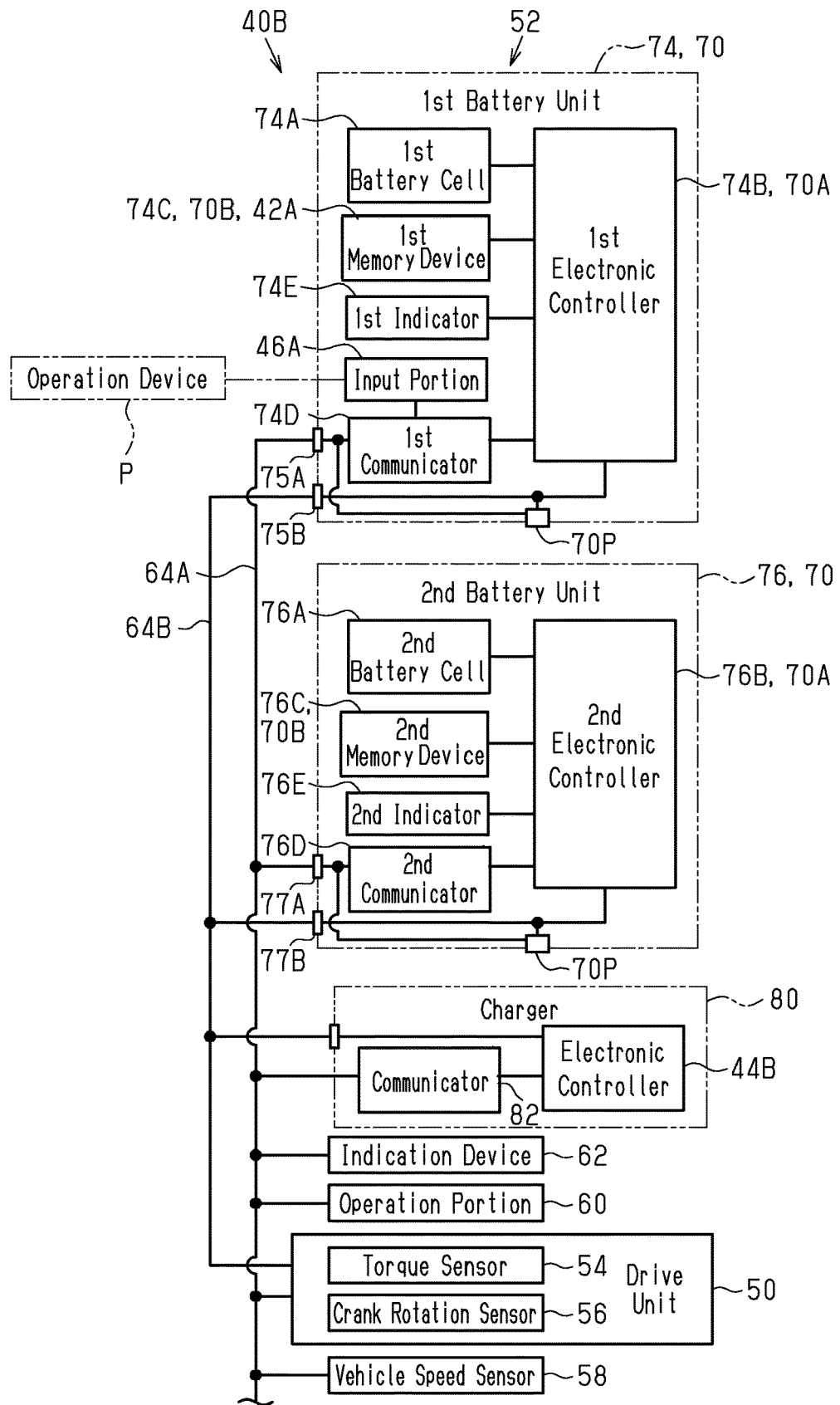
FIG. 9 is a block diagram showing an electrical configuration of a third embodiment of a bicycle power supply system.

A third embodiment of a bicycle power supply system 40B will now be described with reference to FIG. 9. The bicycle power supply system 40B of the third embodiment has the same configuration as the bicycle power supply system 40A of the second embodiment except that the process for switching the battery units 70 between the first state and the second state is executed by an electronic controller 44B of a charger 80 instead of the electronic controller 70A of the battery unit 70. The same reference characters are given to those components that are the same as the corresponding components of the second embodiment. Such components will not be described in detail. FIG. 9 does not show the auxiliary power line 64C and the third terminals 75C, 77C.

The bicycle power supply system 40B includes the memory device 42A and the electronic controller 44B. The bicycle power supply system 40B further includes the input portion 46A, the drive unit 50, the battery 52, the torque sensor 54, the crank rotation sensor 56, the vehicle speed sensor 58, the operation portion 60, the indication device 62, the power communication line 64A and the charger 80. The bicycle power supply system 40B is configured to be connectable to the plurality of battery units 70 and configured to switch each of the plurality of battery units 70 between the first state and the second state.

Each of the battery units 70 is switched between the first state and the second state. In the present embodiment, the first state includes the non-charge state, in which the battery unit 70 is not charged by an external power supply. The second state includes the charge state, in which the battery unit 70 is charged by the external power supply with power from the external power supply. The predetermined order includes the first order switching from the non-charge state to the charge state.

The electronic controller 44B includes an arithmetic processing unit executing predetermined control programs. The arithmetic processing unit includes, for example, a CPU or an MPU. The electronic controller 44B can include one or more microcomputers. The electronic controller 44B further includes a timer. The electronic controller 44B is provided in the charger 80. In the present embodiment, the electronic controller 44B serves as a master in PLC. The electronic controller of the electronic device connected to the power communication line 64A serves as a slave in PLC.

The charger 80 is configured to charge the plurality of battery units 70. The charger 80 is configured to be connectable to an external power supply. The charger 80 includes the electronic controller 44B and a communicator 82. The communicator 82 exchanges signals with other components included in the bicycle power supply system 40B. The charger 80 is configured to be connectable to one of the charging ports 70P of the plurality of battery units 70 or a charging port electrically connected to the power communication line 64A and the power supply line 64B.

In a case where the plurality of battery units 70 is connected, the electronic controller 44B switches the plurality of battery units 70 from one of the first state and the second state to the other one of the first state and the second state in accordance with the order information. The first electronic controller 74B of the first battery unit 74 switches the state of the first battery unit 74 in accordance with a control signal from the electronic controller 44B. The second electronic controller 76B of the second battery unit 76 switches the state of the second battery unit 76 in accordance with a control signal from the electronic controller 44B.

The electronic controller 44B switches the plurality of battery units 70 one by one from the non-charge state to the charge state in the first order. The electronic controller 44B switches one of the first battery unit 74 and the second battery unit 76 from the first state to the second state. Then, in a case where the battery level V of the one of the first battery unit 74 and the second battery unit 76 is greater than or equal to the first value V1 predetermined for the one of the first battery unit 74 and the second battery unit 76, the electronic controller 44B switches the one of the first battery unit 74 and the second battery unit 76 from the charge state to the non-charge state and switches the other one of the first battery unit 74 and the second battery unit 76 from the non-charge state to the charge state. The electronic controller 44B switches the plurality of battery units 70 between the charge state and the non-charge state through the same control as in the first embodiment of the process shown in FIG. 6.

Modifications

The above description illustrates embodiments of a bicycle power supply system according to the present invention and is not intended to be restrictive. The bicycle power supply system of the present invention includes, for example, modifications of the above embodiments described below. Further, two or more of the modifications can be combined. In the following modifications, the same reference characters are given to those components that are the same as the corresponding components of the embodiments. Such components will not be described in detail.

In the first embodiment and its modifications, the order information stored in the memory device 42 can be changed only one of the first order and the second order. In the first embodiment and its modifications, the memory device 42 can be configured to store only one of the first order and the second order. In a case where the memory device 42 does not store the first order, the process of FIG. 6 is not executed. In a case where the memory device 42 does not store the first order, the plurality of battery units 70 can be simultaneously charged. Alternatively, the plurality of battery units 70 can be individually connected to a charger and individually charged. In a case where the memory device 42 does not store the second order, the process of FIG. 7 is not executed. In a case where the memory device 42 does not store the second order, power of the plurality of battery units 70 can be simultaneously used.

In the first embodiment and its modifications, the electronic controller 70A, the memory device 70B, the indicator, and the communicator can be omitted from each battery unit 70. Each battery unit 70 can be connected to the drive unit 50 via a switch that switches the battery unit 70 between the use-permitted state and the use-limited state. The electronic controller 44 of the drive unit 50 can be configured to change the switching state of the switch to select which one of the battery units 70 is switched to the use-permitted state to supply power to the drive unit 50.

Figure 10:
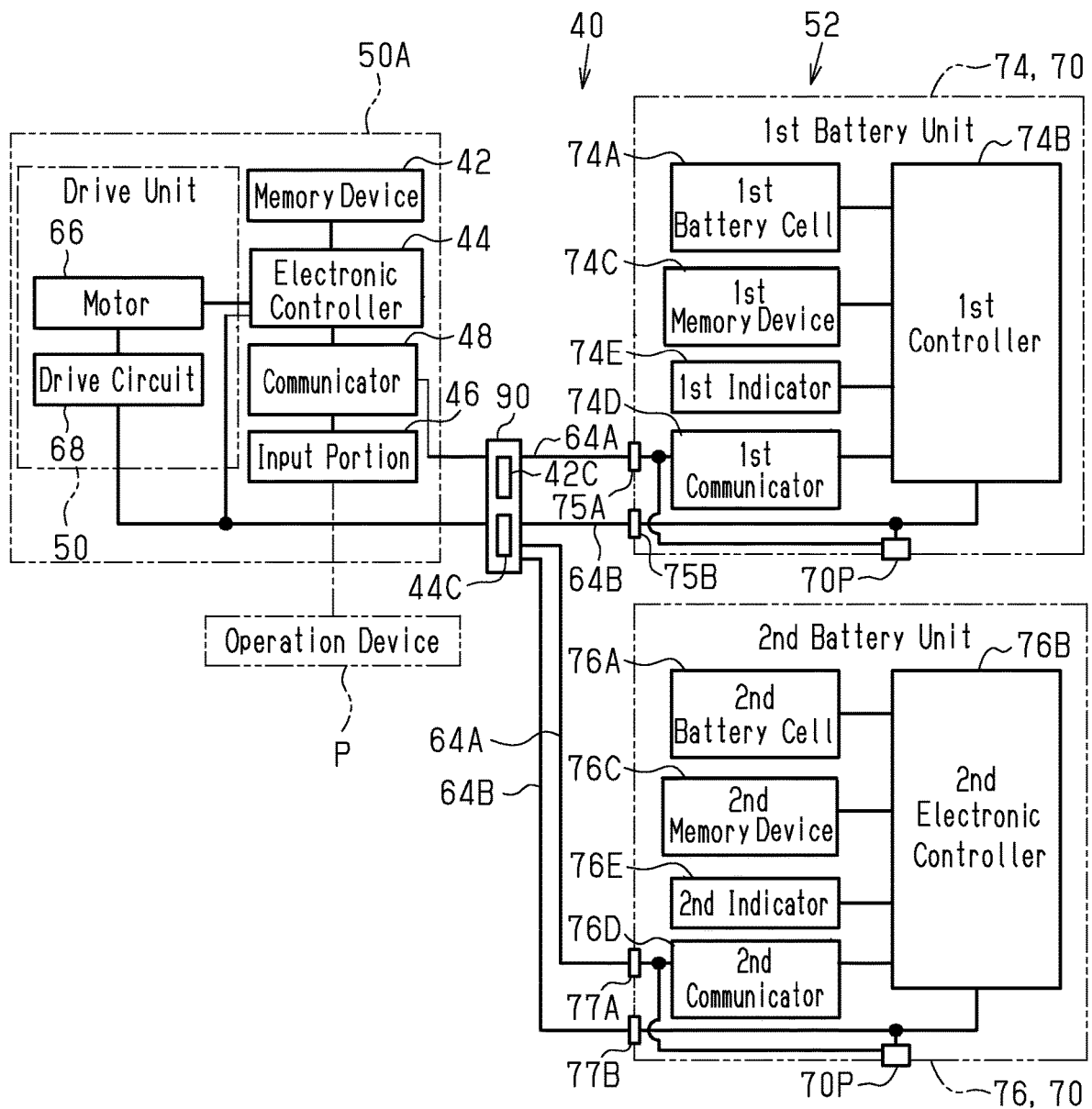
FIG. 10 is a block diagram showing a modified electrical configuration of the bicycle power supply system of the first embodiment.

In the first embodiment and its modifications, for example, as shown in FIG. 10, an electronic device 90 connected between the plurality of battery units 70 and the drive unit 50 can include an electronic controller 44C configured to execute the process for switching the battery units 70 between the first state and the second state instead of the electronic controller 44 of the drive unit 50. At least one of the first order and the second order is stored in a memory device 42C of the electronic device 90 instead of the memory device 42 of the drive unit 50. The electronic device 90 and the drive unit 50 are connected by the power supply line 64B and the power communication line 64A. The electronic device 90 and the first and second battery units 74, 76 are connected by the power supply line 64B and the power communication line 64A. The electronic device 90 and the first and second battery units 74, 76 can be connected by the power supply line 64B and an electrical communication line. In this case, the first communicator 74D and the second communicator 76D can perform communication different from PLC, and the electronic controller 44 is configured to convert signals between the non-PLC communication and PLC. In this modification, the charging ports 70P can be omitted from the battery units 70, and the electronic device 90 can include a charging port electrically connected to an external power supply. In a case where the plurality of battery units 70 is connected, the electronic controller 44C of the modification shown in FIG. 10 switches the plurality of battery units 70 from one of the first state and the second state to the other one of the first state and the second state in accordance with the order information.

In the second embodiment and its modifications, the memory device 42A and the electronic controller 44A can be provided in different battery units 70. For example, the memory device 42A is included in the first memory device 74C of the first battery unit 74, and the electronic controller 44A is included in the second electronic controller 76B of the second battery unit 76.

In the second embodiment and its modifications, the memory device 42A can be included in the memory device 42 of the drive unit 50.

In the third embodiment and its modifications, the memory device 42A can be included in the second memory device 76C of the second battery unit 76 or the memory device 42 of the drive unit 50.

In the second and third embodiments and their modifications, the input portion 46A can be omitted from the first battery unit 74. In this case, the signal for changing the predetermined order can be configured to be received from the input portion 46 of the drive unit 50. In the second and third embodiments and their modifications, the second battery unit 76 can include an input portion, and the charger 80 can include an input portion.

Figure 11:
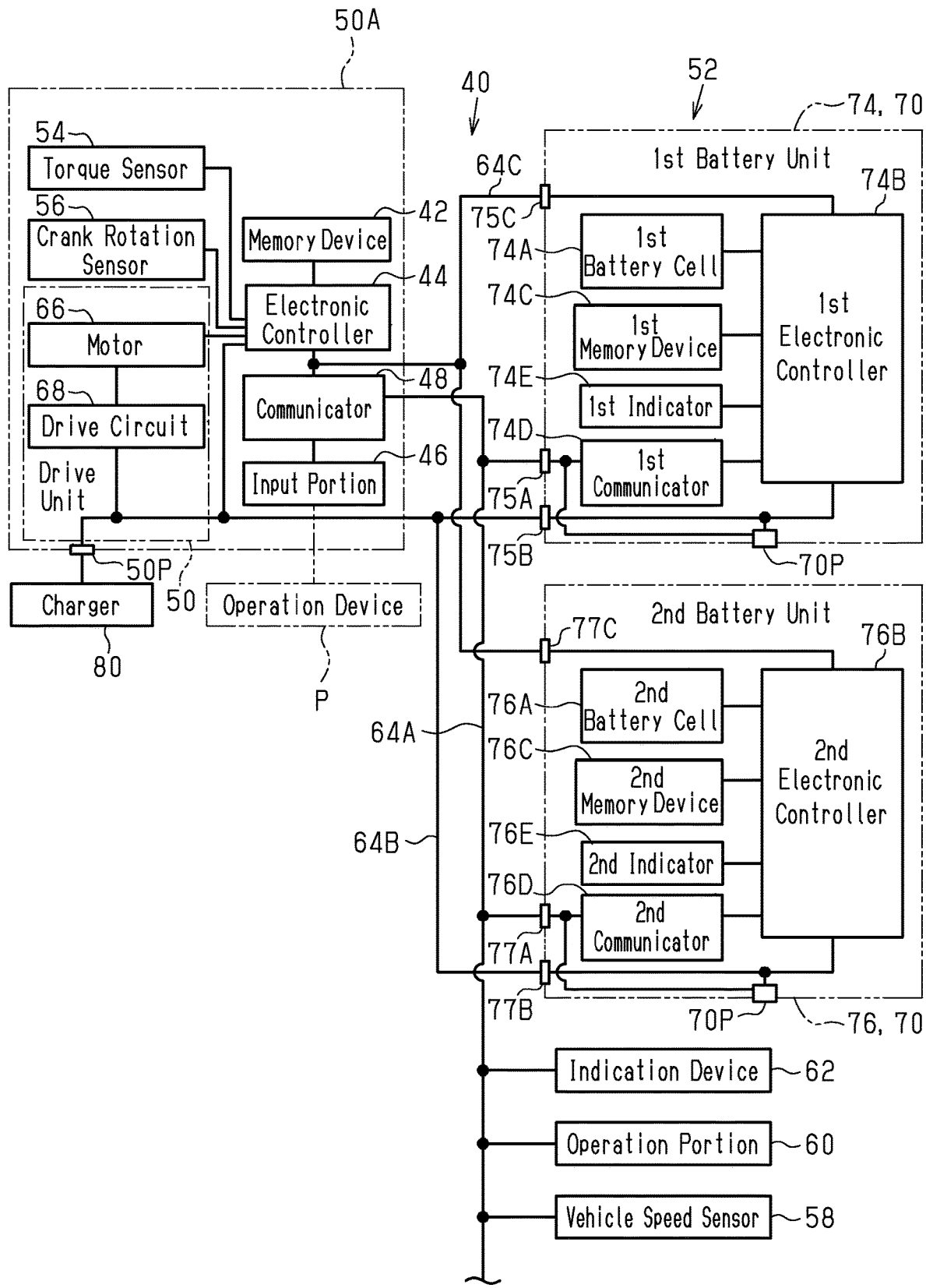
FIG. 11 is a block diagram showing a modified electrical configuration of the bicycle power supply system of the third embodiment.

In each of the embodiments and modifications, the drive unit 50 can include a charging port. In this case, the charging port 70P can be omitted from each battery unit 70. For example, as shown in FIG. 11, the drive unit 50 can further include a port 50P connected to the charger 80, and the charger 80 can be configured to be connectable to the port 50P. The charger 80 can be configured to be connectable to the input portion 46 connectable to the operation device P.

In each of the embodiments and their modifications, a charging port can be provided in a position other than the battery units 70 as long as the power supply line 64B and the power communication line 64A are electrically connected. In this case, the charging ports 70P can be omitted from the battery units 70. For example, the power supply line 64B and the power communication line 64A can branch and connect to a charging port. A plurality of charging ports can be provided instead of one charging port.

In each of the embodiments and their modifications, at least one of the torque sensor 54, the crank rotation sensor 56, the vehicle speed sensor 58, the operation portion 60, and the indication device 62 can be omitted. In the second and third embodiments, the drive unit 50 can be omitted.

In each of the embodiments and modifications, the first indicator 74E can be omitted from at least one of the plurality of battery units 70. In each of the embodiments and modifications, at least one of the charge indicator 74F, the discharge indicator 74G, and the charge level indicator 74H can be omitted from at least one of the plurality of battery units 70.

In each of the embodiments and modifications, the input portions 46, 46A can be omitted. In this case, for example, the indication device 62 can include an operation portion, and the predetermined order stored in the memories 42, 42A can be configured to be changed by the operation portion of the indication device 62. Alternatively, the predetermined order stored in the memories 42, 42A can be configured to be changed by an operation performed on the operation portion 60.

In each of the embodiments and modifications, the auxiliary power line 64C can be omitted. In this case, for example, the electronic circuit forming each electronic controller is configured so that the power communication line 64A has the same function as the auxiliary power line 64C.

In each of the embodiments and modifications, the power communication line 64A, the power supply line 64B, and the auxiliary power line 64C can be shared so that the components are connected by only two power communication lines. In this case, the voltage of the power communication line 64A is, for example, 30 to 50 V. Sharing of the power communication line 64A, the power supply line 64B, and the auxiliary power line 64C reduces the number of wires and simplifies the structure.

The use-limited state of the battery unit 70 can include a non-used state in which power of the battery unit 70 is not used. In the non-used state, the electronic controller 70A of the battery unit 70 can be configured not to supply power to the drive unit 50 from any of the power communication line 64A, the power supply line 64B, and the auxiliary power line 64C.

In each of the embodiments and modifications, the first value V1 can be set to 80% to 90% of the fully charged state of the battery level V. and the electronic controllers 44, 44A, 44B can sequentially charge the plurality of battery units 70 in the first order until the battery levels V of the plurality of battery units 70 become 80% to 90% of the fully charged state. Subsequently, the electronic controllers 44, 44A, 44B can again sequentially charge the battery units 70 to the fully charged state in the first order.

What is claimed is:

1. A bicycle power supply system configured to be connectable to a plurality of battery units and configured to switch each of the plurality of battery units between a first state and a second state, the bicycle power supply system comprising:
    a memory device that stores order information for switching the plurality of battery units from one of the first state and the second state to the other one of the first state and the second state in a predetermined order,
        the first state including at least one of a non-charge state in which the plurality of battery units is not charged by an external power supply and a use-limited state in which use of power of the plurality of battery units is limited,
        the second state including at least one of a charge state in which the plurality of battery units is charged by the external power supply with power from the external power supply and a use-permitted state in which use of power of the plurality of battery units is permitted; and
    an electronic controller configured to switch the plurality of battery units from the one of the first state and the second state to the other one of the first state and the second state in accordance with the order information stored in the memory device in a case where the plurality of battery units is connected,
    the memory device being configured to changeably store the order information in accordance with an operation of an operation device operable by a user.

2. A bicycle power supply system comprising:
    a plurality of battery units;
    a memory device that stores order information for switching the plurality of battery units from one of a first state and a second state to the other one of the first state and the second state in a predetermined order,
        the first state including at least one of a non-charge state in which the plurality of battery units is not charged by an external power supply and a use-limited state in which use of power of the plurality of battery units is limited,
        the second state including at least one of a charge state in which the plurality of battery units is charged by the external power supply with power from the external power supply and a use-permitted state in which use of power of the plurality of battery units is permitted; and
    an electronic controller configured to switch the plurality of battery units from the one of the first state and the second state to the other one of the first state and the second state in accordance with the order information stored in the memory device,
    the memory device being configured to changeably store the order information in accordance with an operation of an operation device operable by a user.

3. The bicycle power supply system according to claim 1, further comprising
    a drive unit including a motor that assists in propulsion of a bicycle,
    the electronic controller being provided in the drive unit.

4. The bicycle power supply system according to claim 3, wherein
    the memory device is provided in the drive unit.

5. The bicycle power supply system according to claim 2, wherein
    the electronic controller is provided in one of the plurality of battery units.

6. The bicycle power supply system according to claim 5, wherein
    the memory device is provided in at least one of the plurality of battery units, and
    the electronic controller is provided in the at least one of the plurality of battery units in which the memory device is provided.

7. The bicycle power supply system according to claim 1, further comprising
    a charger configured to charge the plurality of battery units, the electronic controller being provided in the charger.

8. The bicycle power supply system according to claim 3, wherein
    the memory device is provided in at least one of the plurality of battery units.

9. The bicycle power supply system according to claim 1, wherein
    the first state includes the non-charge state in which the plurality of battery units is not charged by the external power supply,
    the second state includes the charge state in which the plurality of battery units is charged by the external power supply with power from the external power supply,
    the predetermined order includes a first order switching from the non-charge state to the charge state, and the electronic controller is configured to switch the plurality of battery units one by one from the non-charge state to the charge state in the first order.

10. The bicycle power supply system according to claim 9, wherein
the plurality of battery units includes a first battery unit and a second battery unit,
the electronic controller is configured to switch one of the first battery unit and the second battery unit from the first state to the second state, and
the electronic controller is configured to switch the one of the first battery unit and the second battery unit from the charge state to the non-charge state and switch the other one of the first battery unit and the second battery unit from the non-charge state to the charge state upon determining a battery level of the one of the first battery unit and the second battery unit is greater than or equal to a first value predetermined for the one of the first battery unit and the second battery unit.

11. The bicycle power supply system according to claim 1, wherein
the first state includes the use-limited state in which use of power of the plurality of battery units is limited,
the second state includes the use-permitted state in which use of power of the plurality of battery units is permitted,
the predetermined order includes a second order switching from the use-limited state to the use-permitted state, and
the electronic controller is configured to switch the plurality of battery units one by one from the use-limited state to the use-permitted state in the second order.

12. The bicycle power supply system according to claim 11, wherein
the plurality of battery units includes a first battery unit and a second battery unit,
the electronic controller is configured to switch one of the first battery unit and the second battery unit from the use-limited state to the use-permitted state, and
the electronic controller is configured to switch the one of the first battery unit and the second battery unit from the use-permitted state to the use-limited state and switch the other one of the first battery unit and the second battery unit from the use-limited state to the use-permitted state upon determining a battery level of the one of the first battery unit and the second battery unit is less than or equal to a second value predetermined for the one of the first battery unit and the second battery unit.

13. The bicycle power supply system according to claim 10, wherein
the first state includes the use-limited state in which use of power of the plurality of battery units is limited,
the second state includes the use-permitted state in which use of power of the plurality of battery units is permitted,
the predetermined order includes a second order switching from the use-limited state to the use-permitted state, and
the electronic controller is configured to switch the plurality of battery units one by one from the use-limited state to the use-permitted state in the second order.

14. The bicycle power supply system according to claim 13, wherein
the electronic controller is configured to switch one of the first battery unit and the second battery unit from the use-limited state to the use-permitted state, and
the electronic controller is configured to switch the one of the first battery unit and the second battery unit from the use-permitted state to the use-limited state and switch the other one of the first battery unit and the second battery unit from the use-limited state to the use-permitted state upon determining a battery level of the one of the first battery unit and the second battery unit is less than or equal to a second value predetermined for the one of the first battery unit and the second battery unit.

15. The bicycle power supply system according to claim 1, further comprising
an input portion that receives a signal from the operation device, the order information stored in the memory device being changed in response to the input portion receiving a signal for changing the order information.

16. The bicycle power supply system according to claim 2, further comprising
a power communication line electrically connecting the plurality of battery units.

17. The bicycle power supply system according to claim 1, further comprising
an indication device that indicates which one of the first state and the second state the plurality of battery units is in.

18. The bicycle power supply system according to claim 2, wherein
each of the plurality of battery units includes an indicator that indicates which one of the first state and the second state each of the battery units is in.

* * * * *